(12) United States Patent
Lee et al.

(10) Patent No.: US 12,522,450 B2
(45) Date of Patent: Jan. 13, 2026

(54) PARTICLE TRANSFER SYSTEM AND PARTICLE TRANSFER METHOD

(71) Applicant: TECHWIN CO., LTD., Chungcheongbuk-do (KR)

(72) Inventors: Sang Hong Lee, Chungcheongbuk-do (KR); In Seok Jung, Chungcheongbuk-do (KR); Eui Jip Choi, Chungcheongbuk-do (KR); Tai Yeon Kwon, Chungcheongbuk-do (KR); Kyung Seob Lim, Daejeon (KR)

(73) Assignee: TECHWIN CO., LTD., Chungcheongbuk-do (KR)

( * ) Notice: Subject to any disclaimer, the term of this patent is extended or adjusted under 35 U.S.C. 154(b) by 119 days.

(21) Appl. No.: 18/274,518

(22) PCT Filed: Nov. 30, 2021

(86) PCT No.: PCT/KR2021/017811
§ 371 (c)(1),
(2) Date: Jul. 27, 2023

(87) PCT Pub. No.: WO2022/163997
PCT Pub. Date: Aug. 4, 2022

(65) Prior Publication Data
US 2024/0092592 A1 Mar. 21, 2024

(30) Foreign Application Priority Data
Jan. 27, 2021 (KR) .......... 10-2021-0011189

(51) Int. Cl.
*B65G 53/28* (2006.01)
*B65G 53/14* (2006.01)
(Continued)

(52) U.S. Cl.
CPC .............. *B65G 53/14* (2013.01); *B65G 53/50* (2013.01); *B65G 53/66* (2013.01); *B07B 15/00* (2013.01)

(58) Field of Classification Search
CPC ........ B65G 53/28; B65G 53/50; B65G 53/66; B01F 35/711
See application file for complete search history.

(56) References Cited

U.S. PATENT DOCUMENTS 1,939,178 A * 12/1933 Luthy ....................... C11B 1/10
554/12
2,726,136 A * 12/1955 Davis, Jr. ................. B01J 8/003
137/207.5
(Continued)

FOREIGN PATENT DOCUMENTS

CN     110534219 A    12/2019
EP      0692441 A2     1/1996
(Continued)

OTHER PUBLICATIONS

Supplementary Partial European Search Report, mailed Mar. 3, 2025 in Korean Patent Application No. 21923406.9 (11 pages).

*Primary Examiner* — Joseph A Dillon, Jr.
(74) *Attorney, Agent, or Firm* — Panitch Schwarze Belisario & Nadel LLP

(57) ABSTRACT

The present invention relates to a particle transfer system and a particle transfer method which allow preciously-weighed particles to smoothly pass through a vertically-provided vertical pipe of a transfer line when powder-type particles are transferred along the transfer line, and which prevent the particles from remaining or stagnating in the vertical pipe. To this end; the particle transfer system includes a particle transfer unit including at least one from among: a first transfer unit for transferring the particles in correspondence to first transfer information; a second trans- (Continued)

fer unit spaced from the first transfer unit to transfer the particles in correspondence to second transfer information, which is the same as or different from the first transfer information; and a third transfer unit spaced from the first transfer unit and the second transfer unit to transfer the particles in correspondence to third transfer information, which is the same as or smaller in amount than the first transfer information or the second transfer information.

24 Claims, 8 Drawing Sheets

(51) Int. Cl.
    *B65G 53/50*        (2006.01)
    *B65G 53/66*        (2006.01)
    *B07B 15/00*        (2006.01)

(56) References Cited

U.S. PATENT DOCUMENTS

| | | | | |
|---|---|---|---|---|
| 2,835,537 | A * | 5/1958 | Davis, Jr. | B01J 3/02 |
| | | | | 406/108 |
| 2,907,605 | A * | 10/1959 | Brooks | B01F 35/711 |
| | | | | 406/192 |
| 2,986,343 | A * | 5/1961 | De Lara | B01F 35/753 |
| | | | | 239/468 |
| 4,005,908 | A | 2/1977 | Freeman | |
| 4,239,423 | A * | 12/1980 | Sakamoto | B65G 53/30 |
| | | | | 417/102 |
| 4,345,858 | A * | 8/1982 | Barlow | G01G 13/028 |
| | | | | 406/33 |
| 5,073,252 | A * | 12/1991 | Ouig | B22F 9/305 |
| | | | | 209/139.1 |
| 5,433,559 | A | 7/1995 | Vande Sande | |
| 5,865,568 | A * | 2/1999 | Relin | B65G 53/24 |
| | | | | 417/306 |
| 6,527,141 | B2 * | 3/2003 | Sanders | G01F 11/24 |
| | | | | 209/148 |
| 7,465,130 | B2 * | 12/2008 | Herre | B05B 7/1459 |
| | | | | 406/50 |
| 7,556,455 | B2 * | 7/2009 | Relin | B65G 53/28 |
| | | | | 406/12 |
| 7,600,950 | B2 * | 10/2009 | Yuan | B65G 53/06 |
| | | | | 406/150 |
| 7,874,769 | B2 * | 1/2011 | Naunheimer | B01J 8/003 |
| | | | | 406/197 |
| 7,878,736 | B2 * | 2/2011 | Naunheimer | B01J 8/008 |
| | | | | 406/198 |
| 7,878,737 | B2 * | 2/2011 | Naunheimer | B01J 8/125 |
| | | | | 406/123 |
| 7,887,264 | B2 * | 2/2011 | Naunheimer | B01J 8/0025 |
| | | | | 406/198 |
| 8,075,227 | B2 * | 12/2011 | Yuan | B01J 8/003 |
| | | | | 422/291 |
| 8,141,718 | B2 * | 3/2012 | Biester | B01D 21/10 |
| | | | | 210/519 |
| 8,231,310 | B2 * | 7/2012 | Sanwald | B05B 7/1459 |
| | | | | 406/146 |
| 8,573,896 | B2 * | 11/2013 | Relin | F04B 35/04 |
| | | | | 406/10 |
| 8,985,912 | B2 * | 3/2015 | Leininger | B65G 53/16 |
| | | | | 406/122 |
| 9,108,808 | B2 * | 8/2015 | Furuyama | B01D 53/12 |
| 9,504,975 | B2 * | 11/2016 | Yaluris | B01J 8/0025 |
| 9,834,391 | B2 * | 12/2017 | Mauchle | G05D 7/012 |
| 10,189,054 | B2 * | 1/2019 | Fuchigami | G01N 33/15 |
| 10,717,612 | B2 * | 7/2020 | Rickers | F04C 28/24 |
| 10,737,226 | B2 * | 8/2020 | Trahan | B01F 25/31241 |
| 10,752,451 | B2 * | 8/2020 | Baker | B65G 51/00 |
| 11,320,204 | B2 * | 5/2022 | Kusunose | F27D 3/0026 |
| 11,629,016 | B2 * | 4/2023 | Benstead | B65G 53/4691 |
| | | | | 406/128 |
| 11,815,310 | B2 * | 11/2023 | Khankal | C08F 10/00 |
| 11,833,500 | B2 * | 12/2023 | Evans | B01J 8/0015 |
| 11,858,757 | B2 * | 1/2024 | Hiroe | B65G 53/66 |
| 11,925,912 | B2 * | 3/2024 | Chou | B01F 23/49 |
| 11,999,576 | B2 * | 6/2024 | Klose | B65G 53/66 |
| 12,111,019 | B1 * | 10/2024 | Marta | F17D 1/20 |
| 2004/0145103 | A1 * | 7/2004 | Kojima | B25B 11/005 |
| | | | | 269/21 |
| 2005/0178325 | A1 * | 8/2005 | Herre | B05B 7/1459 |
| | | | | 118/308 |
| 2005/0201199 | A1 * | 9/2005 | O'Callaghan | B01F 25/50 |
| | | | | 366/141 |
| 2006/0153649 | A1 * | 7/2006 | Folstadt, Jr. | B65G 53/58 |
| | | | | 406/144 |
| 2019/0255491 | A1 * | 8/2019 | Scates | B29C 48/41 |
| 2023/0058983 | A1 * | 2/2023 | Kuribayashi | B05B 12/122 |
| 2024/0092592 | A1 * | 3/2024 | Lee | B01F 23/59 |
| 2024/0286155 | A1 * | 8/2024 | Sanwald | B05B 7/1459 |
| 2025/0256929 | A1 * | 8/2025 | Paez | B65G 53/66 |

FOREIGN PATENT DOCUMENTS

| | | |
|---|---|---|
| EP | 1730059 B1 | 10/2009 |
| JP | 2017132639 A | 8/2017 |
| KR | 19980073322 A | 11/1998 |
| KR | 20000051437 A | 8/2000 |
| KR | 20140010033 A | 1/2014 |
| KR | 20150029815 A | 3/2015 |

* cited by examiner

[FIG. 1]
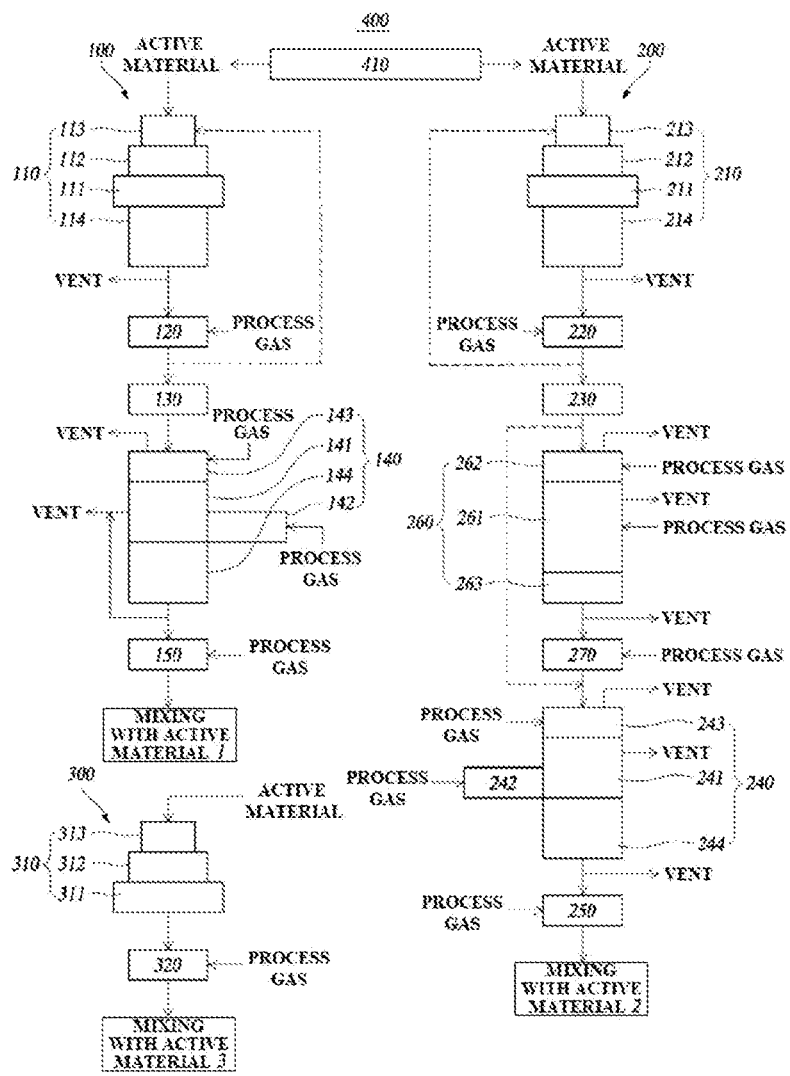

[FIG. 2]
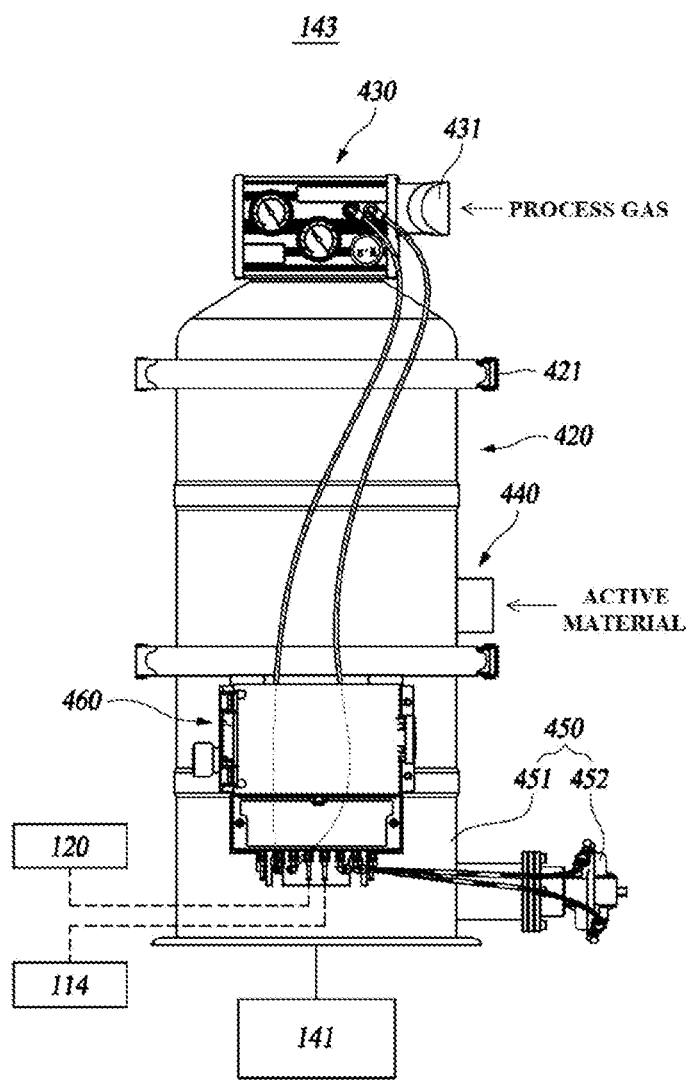

[FIG. 3]
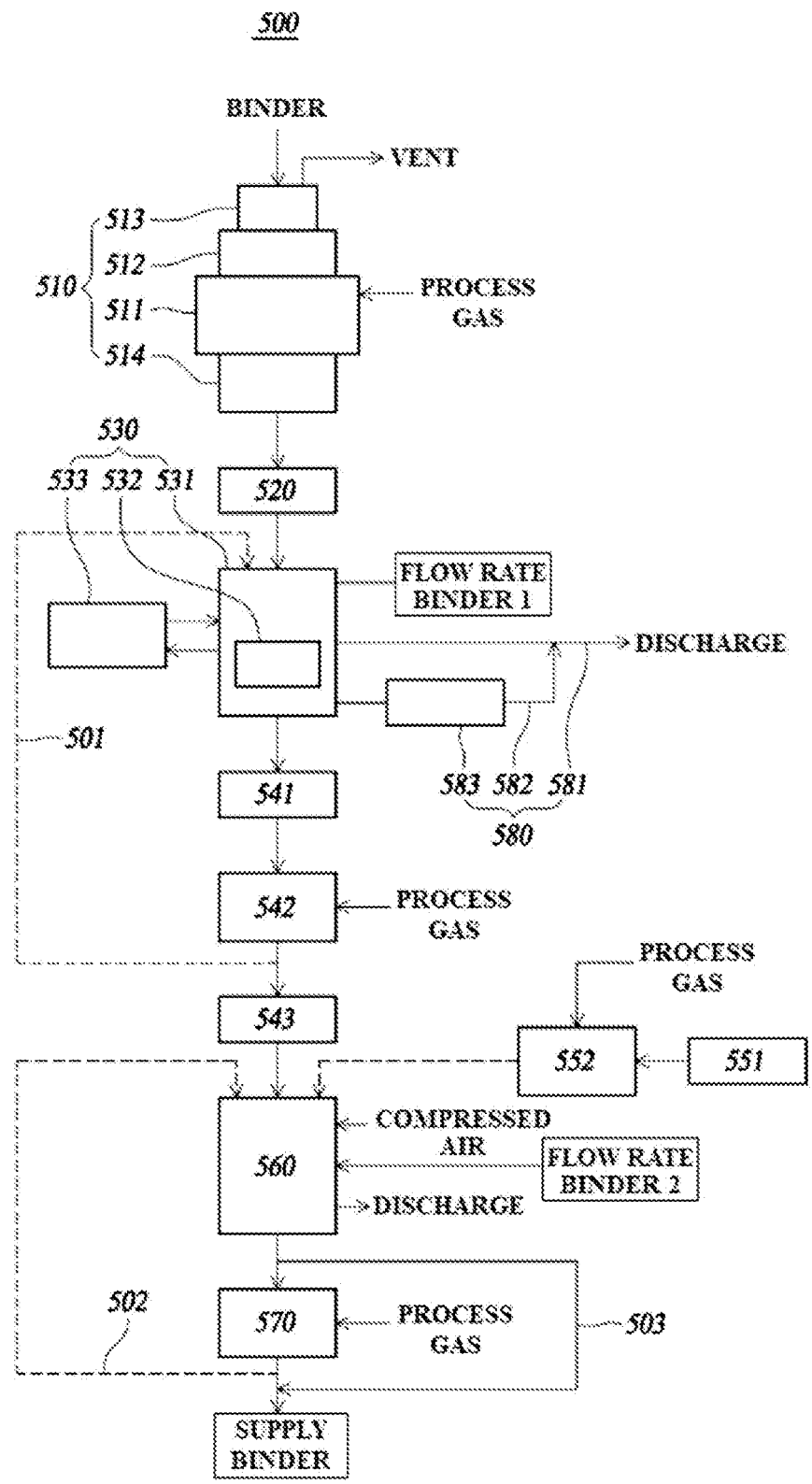

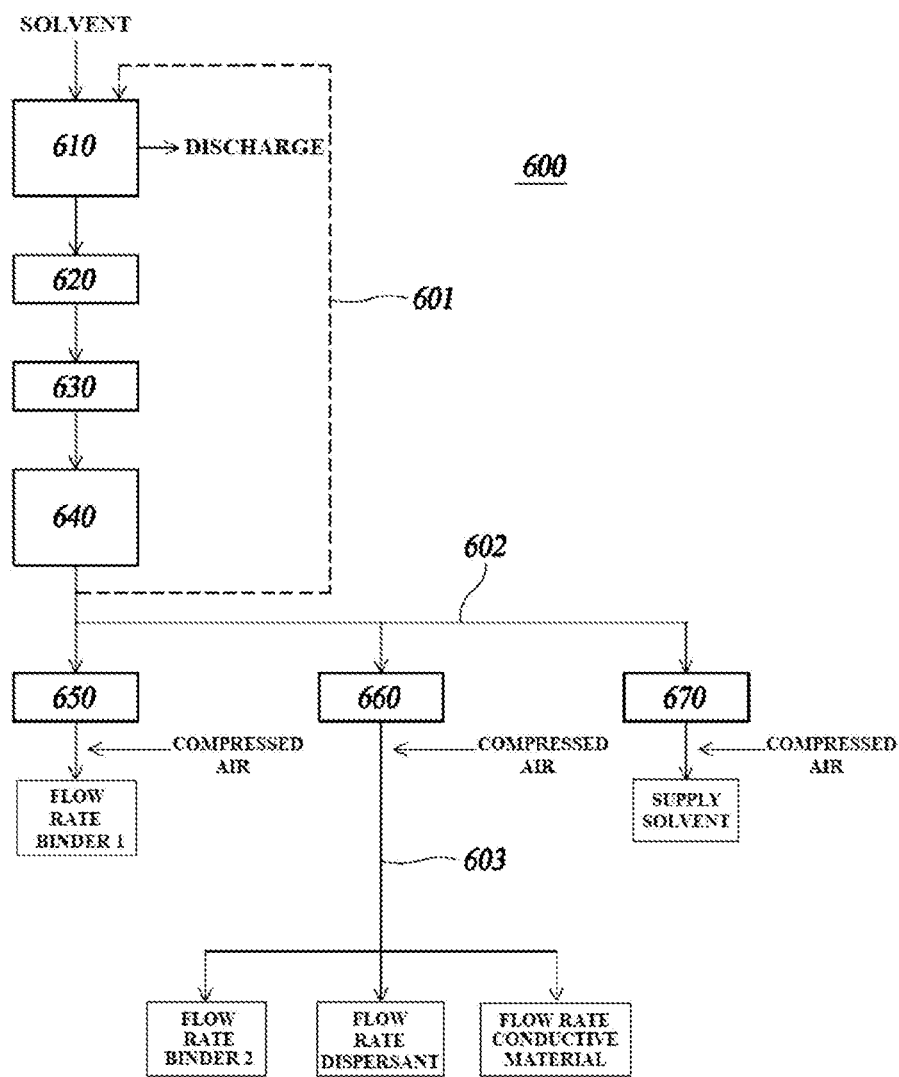
[FIG. 4]

[FIG. 5]
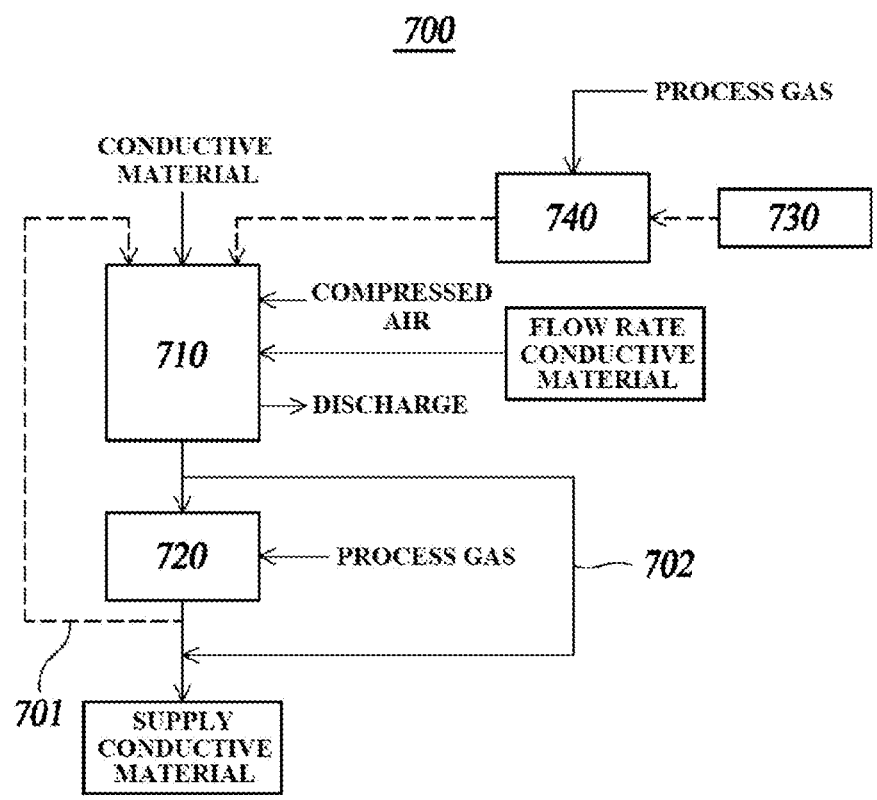

[FIG. 6]
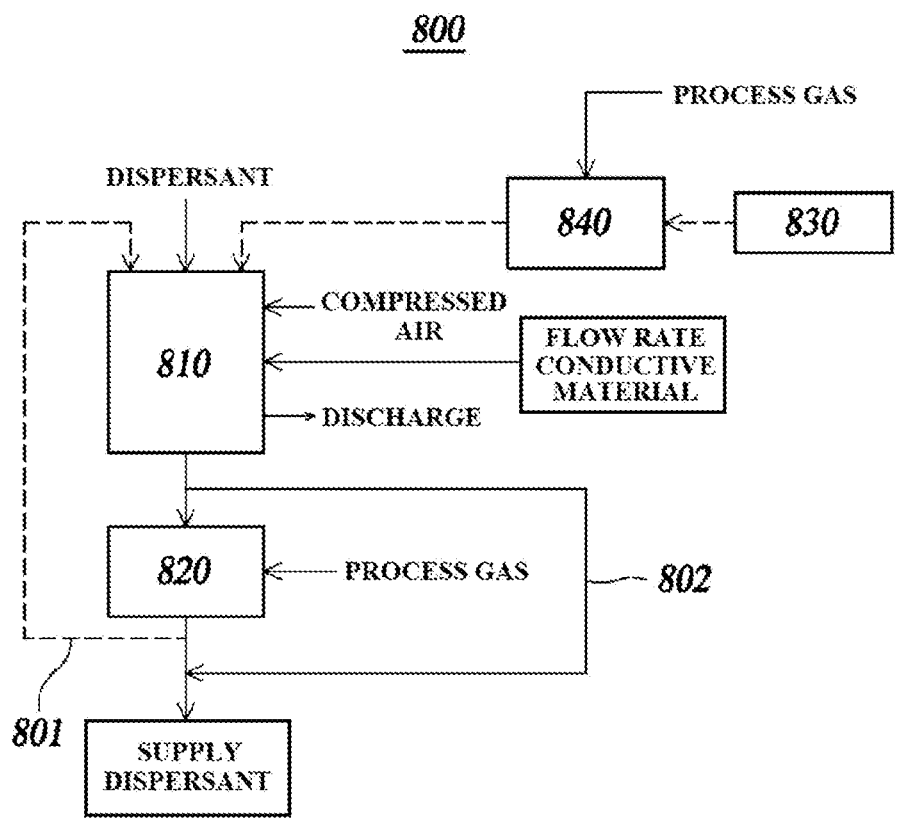

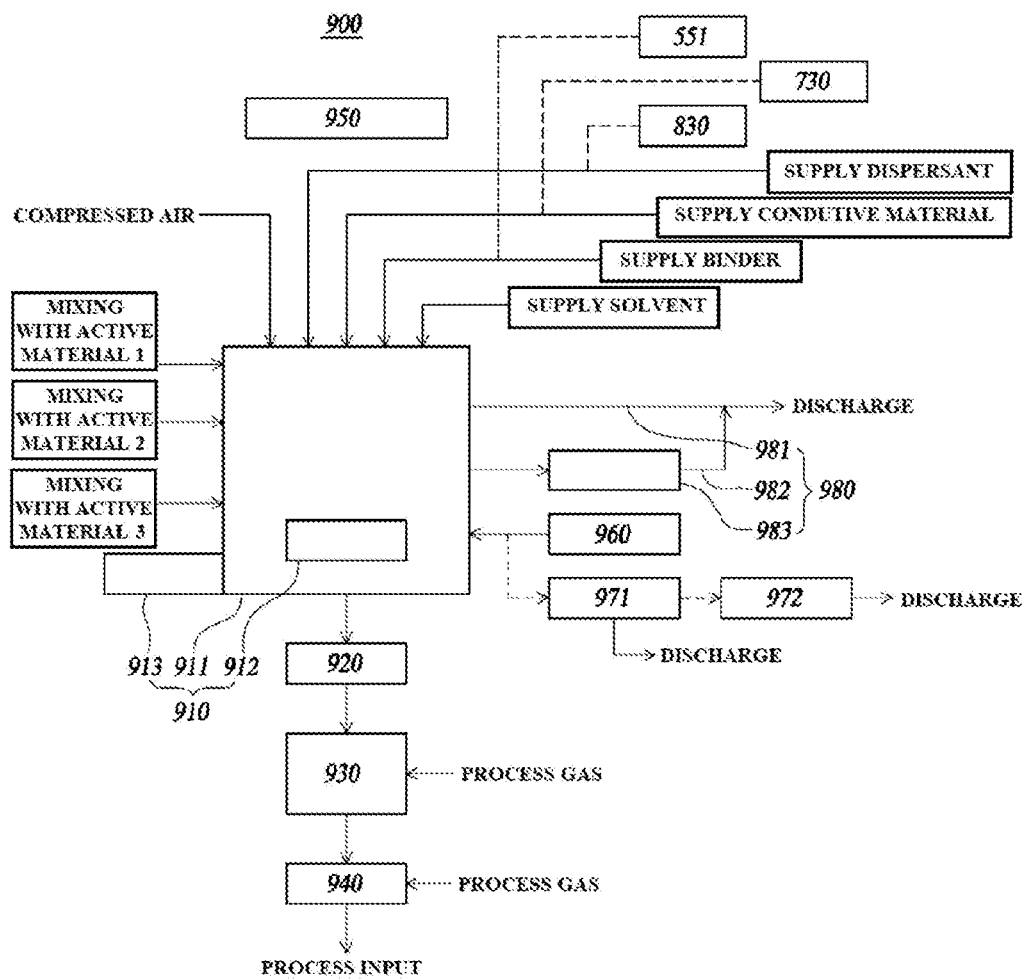

[FIG. 8]
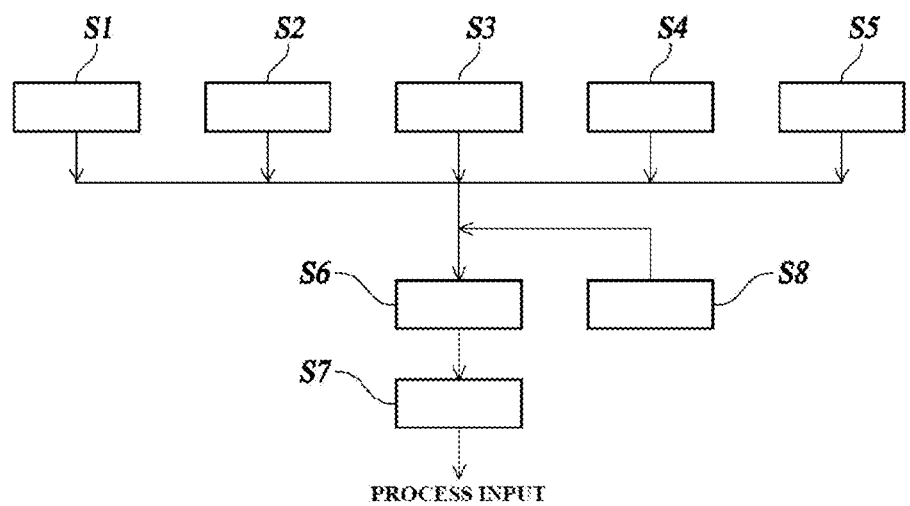

PARTICLE TRANSFER SYSTEM AND PARTICLE TRANSFER METHOD

TECHNICAL FIELD

The present invention relates to a particle transfer system and a particle transfer method, and more specifically, to a particle transfer system and a particle transfer method for allowing preciously-measured particles to smoothly pass through a vertically-installed vertical pipe of a transfer line when powder-type particles are transferred along the transfer line and preventing the particles from remaining or stagnating in the vertical pipe.

BACKGROUND ART

In recent years, interest in energy storage technologies has been increasing.

In general, as the fields of applications of electrochemical devices expand to household appliances such as a mobile phone, a camcorder, a laptop computer, and a desktop computer and furthermore to the energy of electric vehicles, efforts for research and development of the electrochemical devices are becoming more and more specific.

Among various electrochemical devices, liquid electrolyte-based lithium secondary batteries and capacitors applicable to fields requiring high output power characteristics are attracting attention.

These electrochemical devices generally include a positive electrode, a negative electrode, and a separator interposed between the positive electrode and the negative electrode. In this case, the positive electrode and the negative electrode are generally manufactured by a method of forming an electrode active material layer by applying an electrode active material slurry, which includes an electrode active material, a polymer binder, and a solvent for dissolving the polymer binder in order to uniformly mix the electrode active material, to a surface of a current collector.

The electrode active material slurry may further include a conductive material in order to improve electrical conductivities of the electrodes. Meanwhile, in order to form excellent electrodes, the electrode active material slurry further includes a dispersant for uniformly dispersing at least one of the electrode active material and the conductive material. This is because shapes of the electrodes vary depending on degrees of dispersion of the electrode active material and the conductive material, thereby also changing the performance of a battery.

Here, in the case of a powder-type active material, when the active material is transferred from an input hopper to a storage hopper disposed above the input hopper, a vertical pipe of a transfer line should be formed.

However, since the active material remains in the vertical pipe even after the suction-feed is completed when the active material is transferred by the conventional suction-feed method, there is a problem that the vertical pipe is clogged due to the active material falling in the vertical pipe. In addition, since a pressure of the vertical pipe increases when the active material is transferred by the conventional pressure-feed method, a thickness of the pipe increases to handle a load acting on the vertical pipe, resulting in an increase in material costs.

As the related art document, Korean Patent Application Laid-open No. 10-2020-0045368 (published on May 4, 2020, entitled "Method of manufacturing slurry composition for forming electrode active material layer, electrode for lithium secondary battery including active material layer formed of slurry composition, and electrode") is disclosed.

Technical Problem

The present invention is for solving conventional problems and is directed to providing a particle transfer system and a particle transfer method for allowing preciously-measured particles to smoothly pass through a vertically-installed vertical pipe of a transfer line when powder-type particles are transferred along the transfer line and preventing the particles from remaining or stagnating in the vertical pipe.

Technical Solution

According to exemplary embodiments for achieving the objects of the present invention, a particle transfer system includes a particle transfer unit including at least any one of a first transfer unit configured to transfer particles in correspondence to first transfer information, a second transfer unit spaced apart from the first transfer unit to transfer the particles in correspondence to second transfer information that is the same as or different from the first transfer information, and a third transfer unit spaced apart from the first transfer unit and the second transfer unit to transfer the particles in correspondence to third transfer information that is equal to or less than the first transfer information or the second transfer information.

According to the particle transfer system according to the present invention, when the particles in the first transfer unit move up in a first vertical pipe formed to extend in a height direction, some particles in the first transfer information pass through the first vertical pipe by a suction-feed method using a suction force acting on an upper end side of the first vertical pipe, and then, the remaining particles in the first transfer information pass through the first vertical pipe by a pressure-feed method using a pressure acting on a lower end side of the first vertical pipe.

The first transfer unit ray include a first input module in which the particles are stored and configured to measure the particles with the first transfer information and discharge the measured particles, a 1-1 pressure-feed module configured to press the particles discharged from the first input module using a process gas or compressed air so that the particles discharged from the first input module are transferred by the pressure-feed method using the pressure, the first vertical pipe formed to extend in the height direction to form a path through which the particles discharged from the first input module move up, a first measuring module configured to suction and store the particles discharged from the first input module using the process gas or the compressed air or the particles in the first vertical pipe so that the particles discharged from the first input module are transferred by the suction-feed method using the suction force and then measure the particles with the first information and discharge the measured particles using a rotary valve method, and a 1-2 pressure-feed module configured to press the particles discharged from the first measuring module using the process gas or the compressed air so that the particles discharged from the first measuring module are transferred by the pressure-feed method using the pressure, wherein the 1-1 pressure-feed module is connected to the lower end side of the first vertical pipe with respect to the first vertical pipe, and the first input module may be connected to the 1-1 pressure-feed module, and the first measuring module is connected to the upper end side of the first vertical pipe with respect to the first vertical pipe, and the 1-2 pressure-feed module may be connected to the first measuring module.

The first measuring module may include a first measuring hopper in which the particles transferred through the first vertical pipe are stored, a first vacuum ejector configured to suction the particles discharged from the first input module by the suction-feed method using the suction force and transfer the particles to the first measuring hopper, and a first measuring valve configured to measure the particles stored in the first measuring hopper with the first transfer information and discharge the measured particles using the rotary valve method.

The first vacuum ejector ay include a vacuum tank part of which an inside is maintained in a vacuum state by the process gas or the compressed air, a vacuum head part configured to generate the suction force as the process gas or the compressed air is input to maintain the inside of the vacuum tank part in the vacuum state, a particle input part to which the first vertical pipe is connected so that the first vertical pipe and the vacuum tank part communicate with each other, a connection valve part configured to allow the vacuum tank part and the first measuring hopper to be opened or closed to communicate or not communicate with each other, and a control unit configured to control operation relationships between the first input module, the 1-1 pressure-feed module, and the vacuum head part.

The control unit may operate the vacuum head part in a state of stopping the 1-1 pressure-feed module to allow some particles to pass through the first vertical pipe by the suction-feed method using the suction force as the particles are discharged from the first input module, and then, operate the 1-1 pressure-feed module together with a stop of the vacuum head part to allow the remaining particles to pass through the first vertical pipe by the pressure-feed method using the pressure.

The first input module may include a first input hopper in which the particles are stored, a first magnet filter configured to filter magnetic foreign substances from the 16 particles when the particles are input to the first input hopper, a first mesh filter configured to filter non-magnetic foreign substances from the particles when the particles are input to the first input hopper, and a first input valve configured to measure the particles stored in the first input hopper with the first transfer information and discharge the measured particles using the rotary valve method.

According to the particle transfer system according to the present invention, when the particles in the second transfer unit move up in a second vertical pipe formed to extend in a height direction, some particles in the second transfer information may pass through the second vertical pipe by a suction-feed method using a suction force acting on an upper end side of the second vertical pipe, and then, the remaining particles in the second transfer information may pass through the second vertical pipe by a pressure-feed method using a pressure acting on a lower end side of the second vertical pipe.

The second transfer unit may include a second input module in which the particles are stored and configured to measure the particles with the second transfer information and discharge the measured particles, a 2-1 pressure-feed module configured to press the particles discharged from the second input module using a process gas or compressed air so that the particles discharged from the second input module are transferred by the pressure-feed method using the pressure, the second vertical pipe formed to extend in the height direction to form a path through which the particles discharged from the second input module move up, a second measuring module configured to suction and store the particles discharged from the second input module using the process gas or the compressed air or the particles in the second vertical pipe so that the particles discharged from the second input module are transferred by the suction-feed method using the suction force and then measure the particles with the second information and discharge the measured particles using a rotary valve method, and a 2-2 pressure-feed module configured to press the particles discharged from the second measuring module using the process gas or the compressed air so that the particles discharged from the second measuring module are transferred by the pressure-feed method using the pressure, wherein the 2-1 pressure-feed module may be connected to the lower end side of the second vertical pipe with respect to the second vertical pipe, the second input module may be connected to the 2-1 pressure-feed module, the second measuring module may be connected to the upper end side of the second vertical pipe with respect to the second vertical pipe, and the 2-2 pressure-feed module is connected to the second measuring module.

The second measuring module may include a second measuring hopper in which the particles transferred through the second vertical pipe are stored, a second vacuum ejector configured to suction the particles discharged from the second input module by the suction-feed method using the suction force and transfer the particles to the second measuring hopper, and a second measuring valve configured to measure the particles stored in the second measuring hopper with the second information and discharge the measured particles using the rotary valve method.

The second vacuum ejector may include a vacuum tank part of which an inside is maintained in a vacuum state by the process gas or the compressed air, a vacuum head part configured to generate the suction force as the process gas or the compressed air is input to maintain the inside of the vacuum tank part in the vacuum state, a particle input part to which the second vertical pipe is connected so that the second vertical pipe and the vacuum tank part communicate with each other, a connection valve part configured to allow the vacuum tank part and the second measuring hopper to be opened or closed to communicate or not communicate with each other, and a control unit configured to control operation relationships between the second input module, the 2-1 pressure-feed module, and the vacuum head part.

The control unit may operate the vacuum head part in a state of stopping the 2-1 pressure-feed module to allow some particles to pass through the second vertical pipe by the suction-feed method using the suction force as the particles are discharged from the second input module, and then, operate the 2-1 pressure-feed module together with a stop of the vacuum head part to allow the remaining particles to pass through the second vertical pipe by the pressure-feed method using the pressure.

The second transfer unit may include a second input module in which the particles are stored and configured to measure the particles with the second transfer information and discharge the measured particles, a 2-1 pressure-feed module configured to press the particles discharged from the second input module using a process gas or compressed air so that the particles discharged from the second input module are transferred by the pressure-feed method using the pressure, the second vertical pipe formed to extend in the height direction to form a path through which the particles discharged from the second input module move up, a sib module configured to suction and store the particles discharged from the second input module using the process gas or the compressed air or the particles in the second vertical pipe so that the particles discharged from the second input module are transferred by the suction-feed method using the suction force and then measure the particles with the second information and discharge the measured particles using a feeding method, and a silo pressure-feed module configured to press the particles discharged from the silo module using the process gas or the compressed air so that the particles discharged from the silo module are transferred by the pressure-feed method using the pressure, wherein the 2-1 pressure-feed module may be connected to the lower end side of the second vertical pipe with respect to the second vertical pipe, and the second input module may be connected to the 2-1 pressure-feed module, the silo module may be connected to the upper end side of the second vertical pipe with respect to the second vertical pipe, and the silo pressure-feed module may be connected to the silo module.

The silo module may include a particle silo in which the particles transferred through the second vertical pipe are stored, a silo vacuum ejector configured to suction the particles discharged from the second input module by the suction-feed method using the suction force and transfer the particles to the particle silo, and a table feeder configured to measure the particles stored in the particle silo with the second information and discharge the measured particles using the feeding method.

The silo vacuum ejector may include a vacuum tank part of which an inside is maintained in a vacuum state by the process gas or the compressed air, a vacuum head part configured to generate the suction force as the process gas or the compressed air is input to maintain the inside of the vacuum tank part in the vacuum state, a particle input part to which the second vertical pipe is connected so that the second vertical pipe and the vacuum tank part communicate with each other, a connection valve part configured to allow the vacuum tank part and the particle silo to be opened or closed to communicate or not communicate with each other, and a control unit configured to control operation relationships between the second input module, the 2-1 pressure-feed module, and the vacuum head part.

The control unit may operate the vacuum head part in a state of stopping the 2-1 pressure-feed module to allow some particles to pass through the second vertical pipe by the suction-feed method using the suction force as the particles are discharged from the second input module, and then, operate the 2-1 pressure-feed module together with a stop of the vacuum head part to allow the remaining particles to pass through the second vertical pipe by the pressure-feed method using the pressure.

The second transfer unit may include a silo module in which the particles are stored and configured to measure the particles with the second transfer information and discharge the measured particles using the feeding method, a silo pressure-feed module configured to press the particles discharged from the silo module using the process gas or the compressed air so that the particles discharged from the second measuring module are transferred by the pressure-feed method using the pressure, the second vertical pipe formed to extend in the height direction to form a path through which the particles discharged from the silo module move up, a second measuring module configured to suction and store the particles discharged from the silo module using the process gas or the compressed air or the particles in the second vertical pipe so that the particles discharged from the silo module are transferred by the suction-feed method using the suction force and then measure the particles with the second information and discharge the measured particles using a rotary valve method, and a 2-2 pressure-feed module configured to press the particles discharged from the second measuring module using the process gas or the compressed air so that the particles discharged from the second measuring module are transferred by the pressure-feed method using the pressure, the silo pressure-feed module may be connected to the lower end side of the second vertical pipe with respect to the second vertical pipe, the silo module may be connected to the silo pressure-feed module, and the second measuring module may be connected to the upper end side of the second vertical pipe with respect to the second vertical pipe, and the 2-2 pressure-feed module may be connected to the second measuring module.

The second measuring module may include a second measuring hopper in which the particles transferred through the second vertical pipe are stored, a second vacuum ejector configured to suction the particles discharged from the second input module by the suction-feed method using the suction force and transfer the particles to the second measuring hopper, and a second measuring valve configured to measure the particles stored in the second measuring hopper with the second information and discharge the measured particles using the rotary valve method.

The second vacuum ejector may include a vacuum tank part of which an inside is maintained in a vacuum state by the process gas or the compressed air, a vacuum head part configured to generate the suction force as the process gas or the compressed air is input to maintain the inside of the vacuum tank part in the vacuum state, a particle input part to which the second vertical pipe is connected so that the second vertical pipe and the vacuum tank part communicate with each other, a connection valve part configured to allow the vacuum tank part and the second measuring hopper to be opened or closed to communicate or not communicate with each other, and a control unit configured to control operation relationships between the silo module, the silo pressure-feed module, and the vacuum head part.

The control unit may operate the vacuum head part in a state of stopping the silo pressure-feed module to allow some particles to pass through the second vertical pipe by the suction-feed method using the suction force as the particles are discharged from the silo module, and then, operate the silo pressure-feed module together with a stop of the vacuum head part to allow the remaining particles to pass through the second vertical pipe by the pressure-feed method using the pressure.

The second input module may include a second input hopper in which the particles are stored, a second magnet filter configured to filter magnetic foreign substances from the particles when the particles are input to the second input hopper, a second mesh filter configured to filter non-magnetic foreign substances from the particles when the particles are input to the second input hopper, and a second input valve configured to measure the particles stored in the second measuring hopper with the second transfer information and discharge the measured particles using the rotary valve method.

The third transfer unit may include a third input module in which the particles are stored and configured to measure the particles with the third transfer information and discharge the measured particles, and a third pressure-feed module configured to press the particles discharged from the third input module using the process gas or the compressed air so that the particles discharged from the third input module are transferred by the pressure-feed method using the pressure.

The particle transfer system according to the present invention may further include a binder transfer unit configured to convert a binder to be mixed with an active material into a liquid solution in correspondence to binder transfer information and transfer the liquid solution, and a solvent transfer unit configured to transfer a solvent for forming the solution by dissolving the binder in correspondence to solvent transfer information, wherein the particles may be formed of the active material that is a raw material of an electrode.

The binder transfer unit may include a binder input module in which the binder is stored and configured to measure the binder with the binder transfer information and discharge the measured binder, a binder pressure-feed module configured to press the binder discharged from the binder input module using the process gas or the compressed air so that the binder discharged from the binder input module is transferred by the pressure-feed method using the pressure, a binder mixing module configured to mix the binder transferred through the binder pressure-feed module and the solvent transferred through the solvent transfer unit to form the solution, a solution transfer module configured to pump the solution, a solution hopper scale in which the solution transferred from the solution transfer module is stored and capable of discharging a predetermined amount of solution in correspondence to solution transfer information, and a solution supply pump configured to pump the solution of the solution hopper scale in correspondence to the solution transfer information.

The solvent transfer unit may include a solvent tank in which the solvent is stored, a solvent pumping module configured to pump the solvent stored in the solvent tank, a mixing adjustment module configured to adjust an amount of the solvent to be mixed with the binder, and a slurry adjustment module configured to adjust an amount of the solvent to be mixed with a slurry.

The particle transfer system according to the present invention may further include at least any one of a conductive material transfer unit configured to transfer a conductive material to be mixed with a slurry for forming electrodes in correspondence to conductive material transfer information, and a dispersant transfer unit configured to transfer a dispersant to be mixed with the slurry for forming the electrodes in correspondence to dispersant transfer information.

The conductive material transfer unit may include a conductive material hopper scale in which the conductive material is stored, and a conductive material supply pump configured to pump a predetermined amount of the conductive material stored in the conductive material hopper scale in correspondence to the conductive material transfer information.

The dispersant transfer unit may include a dispersant hopper scale in which the dispersant is stored, and a dispersant supply pump configured to pump a predetermined amount of the dispersant stored in the dispersant hopper scale in correspondence to the dispersant transfer information.

The particle transfer system according to the present invention may further include a mixing unit configured to mix the particles transferred through the particle transfer unit, the solution transferred through the binder transfer unit, and the solvent transferred 1 through the solvent transfer unit.

A method of transferring particles using the particle transfer system according to the present invention includes a particle transfer operation including at least any one of a first transfer operation of transferring particles in correspondence to first transfer information, a second transfer operation of transferring the particles in correspondence to second transfer information that is the same as or different from the first transfer information, and a third transfer operation of transferring the particles in correspondence to third transfer information that is less than the first transfer information or the second transfer information.

The first transfer operation may include a first suction-feed operation of allowing some particles in the first transfer information to pass through a first vertical pipe by a suction-feed method using a suction force acting on an upper end side of the first vertical pipe when the particles in the first transfer unit move up in the first vertical pipe formed to extend in a height direction, and a first pressure-feed operation of allowing the remaining particles in the first transfer information to pass through the first vertical pipe by a pressure-feed method using a pressure acting on a lower end side of the first vertical pipe after the first suction-feed operation.

The second transfer operation may include a second suction-feed operation of allowing some particles in the second transfer information to pass through a second vertical pipe by the suction-feed method using a suction force acting on an upper end side of the second vertical pipe when the particles in the second transfer unit move up in the second vertical pipe formed to extend in a height direction, and a second pressure-feed operation of allowing the remaining particles in the second transfer information to pass through the second vertical pipe by a pressure-feed method using a pressure acting on a lower end side of the second vertical pipe after the second suction-feed operation.

The third transfer operation may include a third input operation of measuring the particles stored in the third input module with the third transfer information and discharging the measured particles, and a third pressure-feed operation of pressing the particles discharged from the third input module using a process gas or compressed air so that the particles discharged after the third input operation are transferred by the pressure-feed method using the pressure.

The method according to the present invention may further include a binder transfer operation of converting a binder to be mixed with an active material into a liquid solution in correspondence to binder transfer information and transferring the liquid solution, and a solvent transfer operation of transferring a solvent for forming the solution by dissolving the binder in correspondence to solvent transfer information, wherein the particles may be formed of the active material that is a raw material of an electrode.

The method according to the present invention may further include at least any one of a conductive material transfer operation of transferring a conductive material to be mixed with a slurry for forming the electrodes in correspondence to conductive material transfer information, and a dispersant transfer operation of transferring a dispersant to be mixed with the slurry for forming the electrodes in correspondence to dispersant transfer information.

The method may further include a mixing operation of mixing the particles transferred through the particle transfer operation, the solution transferred through the binder transfer operation, and the solvent transferred through the solvent transfer operation to form a slurry for forming the electrodes.

Advantageous Effects

According to a particle transfer system and a particle transfer method according to the present invention, it is possible to allow preciously-measured particles to smoothly pass through a vertically-installed vertical pipe of a transfer line when powder-type particles are transferred along the particle transfer line and prevent the particles from remaining or stagnating in the vertical pipe.

In addition, according to the present invention, since the pressure-feed of particles is performed after the suction-feed of the particles in a first particle line of the particle transfer line, it is possible to minimize a load acting on a first vertical pipe, reduce a thickness of the first vertical pipe, and expect the cost saving effect by reducing maintenance and material costs.

In addition, according to the present invention, through a detailed configuration of a first transfer unit, it is possible to smoothly transfer particles between a first input module and a first measuring module and clearly perform the suction-feed of the particles and the pressure-feed of the particles in the first particle line of the particle transfer line.

In addition, according to the present invention, through a detailed configuration of the first measuring module, it is possible to stably generate a suction force for suction-feeding the particles in the first particle line of the particle transfer line and smoothly transfer particles between the first vertical pipe and a first measuring hopper in an integrated first measuring module.

In addition, according to the present invention, through a detailed configuration of a first vacuum ejector, it is possible to provide a stable suction force to particles, clearly perform continuous transfer of the particles in correspondence to first transfer information, and prevent the particles from remaining or stagnating in the first vertical pipe, thereby eliminating the clogging of the first particle line or the first vertical pipe.

In addition, according to the present invention, through a detailed configuration of the first input module, it is possible to easily transfer particles transferred from the outside and remove foreign substances mixed with the particles, thereby increasing the purity of the particles.

In addition, according to the present invention, since the pressure-feed of the particles is performed after the suction-feed of the particles in a second particle line of the particle transfer line, it is possible to minimize a load acting on a second vertical pipe, reduce a thickness of the second vertical pipe, and expect the cost saving effect by reducing the maintenance and material costs.

In addition, according to the present invention, through a detailed configuration of a second transfer unit, it is possible to smoothly transfer particles between a second input module and a second measuring module and clearly perform the suction-feed of the particles and the pressure-feed of the particles in the second particle line of the particle transfer line.

In addition, according to the present invention, through a detailed configuration of the second measuring module, it is possible to stably generate a suction force for suction-feeding the particles in the second particle line of the particle transfer line and smoothly transfer particles between the second vertical pipe and a second measuring hopper.

In addition, according to the present invention, through a detailed configuration of a second vacuum ejector, it is possible to provide a stable suction force to particles, clearly perform continuous transfer of the particles in correspondence to second transfer information, and prevent the particles from remaining or stagnating in the second vertical pipe, thereby eliminating the clogging of the second particle line or the second vertical pipe.

In addition, according to the present invention, through a detailed configuration of the second transfer unit, it is possible to smoothly transfer particles between the second input module and a silo module and clearly perform the suction-feed of the particles and the pressure-feed of the particles in the second particle line of the particle transfer line.

In addition, according to the present invention, through a detailed configuration of the silo module, it is possible to stably generate a suction force for suction-feeding the particles in the second particle line of the particle transfer line and smoothly transfer particles between the second vertical pipe and a particle silo in an integrated silo module.

In addition, according to the present invention, through a detailed configuration of a silo vacuum ejector, it is possible to provide a stable suction force to particles, dearly perform continuous transfer of the particles in correspondence to the second transfer information, and prevent the particles from remaining or stagnating in the second vertical pipe, thereby eliminating the dogging of the second particle line or the second vertical pipe.

In addition, according to the present invention, through the detailed configuration of the second transfer unit, it is possible to smoothly transfer particles between the silo module and the second measuring module and clearly perform the suction-feed of the particles and the pressure-feed of the particles in the second particle line of the particle transfer line.

In addition, according to the present invention, it is possible to store a large amount of particles transferred from the outside and then intermittently discharge the particles through the silo module.

In addition, according to the present invention, through a detailed configuration of the second input module, it is possible to easily transfer the particles transferred from the outside and remove foreign substances mixed with the particles, thereby increasing the purity of the particles.

In addition, according to the present invention, through a detailed configuration of a third transfer unit, it is possible to adjust an amount of particles according to a state of a slurry finally completed in a mixing unit that is a final destination of the particles and additionally input the particles.

In addition, according to the present invention, through an additional configuration of a binder transfer unit and a solvent transfer unit, it is possible to stably manufacture a slurry for forming electrodes using particles formed of an active material.

In addition, according to the present invention, through a detailed configuration of the binder transfer unit, it is possible to stably dissolve a powder-type or fillet-type binder and simply adjust a concentration of a solution formed by dissolving the binder.

In addition, according to the present invention, through a detailed configuration of the solvent transfer unit, it is possible to stably supply a predetermined amount of solvent to a required unit.

In addition, according to the present invention, through an additional configuration of a conductive material transfer unit, it is possible to stably supply a predetermined amount of conductive material to the finally-completed slurry and increase the electrical conductivity of the slurry.

In addition, according to the present invention, through a detailed configuration of the conductive material transfer unit, it is possible to smoothly transfer the conductive material by liquefying the conductive material and allow the conductive material and the active material to safely uniformly form a mixture.

In addition, according to the present invention, through an additional 1 configuration of a dispersant transfer unit, it is possible to smoothly transfer the particles that are the active material and increase the merchantability of the finally-completed slurry.

In addition, according to the present invention, through a detailed configuration of the dispersant transfer unit, it is possible to smoothly transfer a dispersant by liquefying the dispersant, allow the dispersant to smoothly perform a pre-dispersion of the active material, and allow the dispersant and the active material to stably uniformly form a mixture.

In addition, according to the present invention, through an additional configuration of a mixing unit, it is possible to stabilize the finally-completed slurry in order to form electrodes.

In addition, according to the present invention, through a detailed configuration of the mixing unit, it is possible to allow the slurry to stably uniformly form the mixture and simply adjust a concentration of the slurry.

In addition, according to the present invention, through detailed configurations of a particle transfer method, it is possible to clarify the coupling relationship of the particle transfer system, implement a stable particle transfer system, and clearly provide the effects of the above-described units.

DESCRIPTION OF DRAWINGS

FIG. 1 is a block diagram for the transfer of an active material, which is particles, in a particle transfer system according to one embodiment of the present invention.

FIG. 2 is a view illustrating a transfer control unit in the particle transfer system according to one embodiment of the present invention.

FIG. 3 is a block diagram for the transfer of a binder to be mixed with the active material in the particle transfer system according to one embodiment of the present invention.

FIG. 4 is a block diagram for the transfer of a solvent to be mixed with the active material in the particle transfer system according to one embodiment of the present invention.

FIG. 5 is a block diagram for the transfer of a conductive material to be mixed with the active material in the particle transfer system according to one embodiment of the present invention.

FIG. 6 is a block diagram for the transfer of a dispersant to be mixed with the active material in the particle transfer system according to one embodiment of the present invention.

FIG. 7 is a block diagram illustrating a mixing unit for mixing materials in the particle transfer system according to one embodiment of the present invention.

FIG. 8 is a block diagram illustrating a particle transfer method according to one embodiment of the present disclosure.

MODES OF THE INVENTION

Hereinafter, embodiments of a particle transfer system and a particle transfer method according to the present invention will be described with reference to the accompanying drawings. In this case, the present invention is not limited or restricted by the embodiments. In addition, in describing the present invention, detailed descriptions of well-known functions or configurations may be omitted to clarify the gist of the present invention.

The particle transfer system according to one embodiment of the present invention can allow preciously-metered particles to smoothly pass through a vertically-installed vertical pipe of a particle transfer line when powder-type particles are transferred along the particle transfer line and prevent the particles from remaining or stagnating in the corresponding vertical pipe.

In the following description, the particle transfer line represents a particle transfer path in a particle transfer lit 400, a first particle line represents a particle transfer path in a first transfer unit 100, a second particle line represents a particle transfer path in a second transfer unit 200, and a third particle line represents a particle transfer path in a third transfer unit 300. In addition, a binder transfer line represents a binder transfer path in a binder transfer unit 500, a solvent transfer line represents a solvent transfer path in a solvent transfer unit 600, a conductive material transfer line represents a conductive material transfer path in a conductive material transfer unit 700, and a dispersant transfer line represents a dispersant transfer path in a dispersant transfer unit 800.

In the particle transfer system according to one embodiment of the present invention, particles may be formed of an active material. The particle transfer system according to one embodiment of the present invention will be described as a system for manufacturing a slurry for forming electrodes of an electrochemical device.

The active material is a raw material of the electrode of the electrochemical device.

The binder provides a binding force to the finally-completed slurry to form the electrodes of the electrochemical device.

The solvent at least dissolves the binder among the binder, the conductive material, and the dispersant, thereby increasing the binding force of the active material or the finally-completed slurry.

The conductive material forms an electron conduction passage in the finally-completed slurry to improve the electrical conductivity of the electrodes of the electrochemical device, thereby increasing the conductivity of the finally-completed slurry.

The dispersant disperses at least any one of the active material and the conductive material so that the finally-completed slurry is uniformly mixed.

An electrolyte helps ions to smoothly move with respect to the finally-completed slurry.

A concentration of the slurry may be adjusted by adjusting the solvent or the electrolyte in the finally-completed slurry.

The particle transfer system according to one embodiment of the present invention may include the particle transfer unit 400 for transferring the particles. In the particle transfer unit 400, the particles are transferred along the particle transfer line.

The particle transfer unit 400 may include at least any one of the first transfer unit 100 for transferring particles in correspondence to first transfer information, the second transfer unit 200 spaced apart from the first transfer unit 100 to transfer the particles in correspondence to second transfer information that is the same as or different from the first transfer information, and the third transfer unit 300 spaced apart from the first transfer unit 100 and the second transfer unit 200 to transfer the particles in correspondence to third transfer information that is less than the first transfer information or the second transfer information.

First, the first transfer unit 100 may transfer the particles in a first vertical pipe 130 in two stages.

More specifically, when the particles in the first transfer unit 100 move up in the first vertical pipe 130 formed to extend in a height direction, some particles in the first transfer information may pass through the first vertical pipe 130 by a suction-feed method using a suction force acting on an upper end side of the first vertical pipe 130. Next, the remaining particles in the first transfer information may pass through the first vertical pipe 130 by a pressure-feed method using a pressure acting on a lower end side of the first vertical pipe 130.

As described above, since the particles transferred from the first transfer unit 100 pass through the first vertical pipe 130 by sequentially applying the suction-feed method and the pressure-feed method to the first vertical pipe 130, it is possible to allow the particles to completely pass through the first vertical pipe 130, prevent the particles from stagnating in the first vertical pipe 130, and prevent the first vertical pipe 130 from being clogged by the particles.

The first transfer unit 100 may include a first input module 110 in which the particles are stored and which measures the particles with the first transfer information and discharges the measured particles, a 1-1 pressure-feed module 120 for pressing the particles discharged from the first input module 110 using a process gas or compressed air so that the particles discharged from the first input module 110 are transferred by the pressure-feed method using the pressure, the first vertical pipe 130 formed to extend in the height direction to form a path through which the particles discharged from the first input module 110 move up, a first measuring module 140 for suctioning and storing the particles discharged from the first input module 110 using the process gas or the compressed air or the particles in the first vertical pipe 130 so that the particles discharged from the first input module 110 are transferred by the suction-feed method using the suction force and then measuring the particles with the first information and discharging the measured particles using a rotary valve method, and a 1-2 pressure-feed module 150 for pressing the particles discharged from the first measuring module 140 using the process gas or the compressed air so that the particles discharged from the first measuring module 140 are transferred by the pressure-feed method using the pressure.

In this case, the 1-1 pressure-feed module 120 is connected to the lower end side of the first vertical pipe 130 with respect to the first vertical pipe 130, and the first input module 110 is connected to the 1-1 pressure-feed module 120. In addition, the first measuring module 140 is connected to the upper end side of the first vertical pipe 130 with respect to the first vertical pipe 130, and the 1-2 pressure-feed module 150 is connected to the first measuring module 140.

The first input module 110 may include a first input hopper 111 in which the particles are stored, a first magnet filter 112 for filtering magnetic foreign substances from the particles when the particles are input to the first input hopper 111, a first mesh filter 113 for filtering non-magnetic foreign substances from the particles when the particles are input to the first input hopper 111, and a first input valve 114 for measuring the particles stored in the first input hopper 111 with the first transfer information and discharging the measured particles using a rotary valve method.

The first input hopper 111 may accommodate all of the particles stored in a particle bag, which are transferred from the outside through a particle transfer module 410. The particle transfer module 410 may be formed of a crane or a chain block. A capacity of the first input hopper 111 may variously vary depending on a transfer speed of the particle and a unit transfer amount of the particle.

The first magnet filter 112 and the first mesh filter 113 may be spaced apart from each other and disposed on an upper end of the first input hopper 111 to filter foreign substances from the particles supplied from the particle bag.

In one embodiment of the present invention, since the first mesh filter 113 is disposed above the first magnet filter 112, it is possible to provide the crushing effect of the agglomerated particles, restore sizes of the agglomerated particles to original sizes, and improve the effect of filtering the magnetic foreign substances from the particles transferred from the particle bag.

Since a plurality of pockets disposed at equal intervals in a circumferential direction about an intermittently-rotated rotation shaft are provided on the first input valve 114, a predetermined amount of particles may be accommodated in the corresponding pocket. The predetermined amount of particle may be accommodated in one pocket of the first input valve 114 in correspondence to the first transfer information. A capacity of one pocket of the first input valve 114 may variously vary depending on the transfer speed of the particle and the unit transfer amount of the particles in correspondence to the first transfer information.

Since the 1-1 pressure-feed module 120 supplies the process gas or the compressed air generated from the system to the particles intermittently discharged from the first input hopper 111 of the first input module 110, it is possible to stably press the particles in the first particle line.

In order to adjust an internal pressure of the first particle line, a vent for discharging gas between the first input valve 114 and the 1-1 pressure-feed module 120 or allowing external gas to be injected therethrough may be provided between the first input valve 114 of the first input module 110 and the 1-1 pressure-feed module 120. The first vertical pipe 130 forms a part of the first particle line of the particle transfer line. The first vertical pipe 130 forms a path through which the particles move up in the height direction of the system on the first particle line. The first vertical pipe 130 may be formed to extend in the height direction of the system.

The first measuring module 140 may include the first measuring hopper 141 in which the particles transferred through the first vertical pipe 130 are stored, a first vacuum ejector 143 for suctioning the particles discharged from the first input module 110 by the suction-feed method using the suction force and transferring the particles to the first measuring hopper 141, and a first measuring valve 144 for measuring the particles stored in the first measuring hopper 141 with the first information and discharging the measured 16 particles using a rotary valve method.

The first measuring hopper 141 may sequentially accommodate the particles transferred through the 1-1 pressure-feed module 120. A capacity of the first measuring hopper 141 may variously vary depending on the transfer speed of the particle and the unit transfer amount of the particle.

A first air unit 142 for dispersing the particles accommodated in the first measuring hopper 141 using the process gas may be provided on the first measuring hopper 141. The first air unit 142 may inject the process gas into the first measuring hopper 141, thereby preventing the agglomeration of the particles accommodated in the first measuring hopper 141. In order to adjust an internal pressure of the first measuring hopper 141, a vent for discharging the gas of the first measuring hopper 141 or allowing external gas to be injected therethrough may be provided on the first measuring hopper 141.

The first vacuum ejector 143 may include a vacuum tank part 420 of which an inside is maintained in a vacuum state by the process gas or the compressed air, a vacuum head part 430 for generating the suction force as the process gas or the compressed air are input to maintain the inside of the vacuum tank part 420 in the vacuum state, a particle input part 440 to which the first vertical pipe 130 is connected so that the first vertical pipe 130 and the vacuum tank part 420 communicate with each other, a connection valve part 450 for opening or closing the vacuum tank part 420 and the first measuring hopper 141 to communicate or not communicate with each other, and a control unit 460 for controlling the operation relationships between the first input module 110, the 1-1 pressure-feed module 120, and the vacuum head part 430.

It is preferable that the vacuum tank part 420 have a cylindrical shape to support the suction force. Since a vacuum jacket part 421 surrounds and supports the vacuum tank part 420, it is possible to prevent the deformation of the vacuum tank part 420 and protect the vacuum tank part 420.

It is advantageous that the vacuum head part 430 is provided on an upper end of the vacuum tank part 420. A gas injection portion 431 through which the process gas or the compressed air are injected may be provided on the vacuum head part 430, and a gas discharge portion spaced apart from the gas injection portion 431 and through which the process gas generated by generating the suction force are discharged may be provided on the vacuum head part 430.

A Venturi portion (not illustrated) for providing the suction force to the particles using the Venturi effect using the process gas or the compressed air may be provided on the vacuum head part 430 to stabilize the suction-feed of the particles and simply adjust a suction-feed period.

The particle input part 440 may be provided on a side surface of the vacuum tank part 420 or the upper end of the vacuum tank part 420 to smoothly transfer the particles from the first vertical pipe 130.

It is advantageous that the connection valve part 450 is provided on a lower end of the vacuum tank part 420. The connection valve part 450 may include a vacuum buffer portion provided on the lower end of the vacuum tank part 420 to maintain the vacuum state of the vacuum tank part 420, a valve body portion 451 provided on a lower end of the vacuum buffer portion and configured to communicate with the first measuring hopper 141 of the first measuring module 140, a valve opening and closing portion provided on the valve body portion 451 to open and close the valve body portion 451 or adjust an opening of the valve body portion 451, and an opening and closing driving portion 452 for operating the valve opening and closing portion.

As the particles are discharged from the first input module 110, the control unit 460 may operate the vacuum head part 430 in a state of stopping the 1-1 pressure-feed module 120 so that some particles pass through the first vertical pipe 130 by the suction-feed method using the suction force, and then operate the 1-1 pressure-feed module 120 together with the stop of the vacuum head part 430 so that the remaining particles pass through the first vertical pipe 130 by the pressure-feed method using the pressure, thereby stably discharging the particles from the first vertical pipe 130.

More specifically, an operation of the control unit 460 will be described as follows.

When one pocket communicates with the first particle line due to the rotation of a rotation shaft of the first input valve 114, the particle transfer by the suction-feed method, the particle transfer by the pressure-feed method, and the return of the particles and the gas by the remaining pressure are sequentially performed.

After all of the particles pass through the first vertical pipe 130 by the pressure through the 1-1 pressure-feed module 120, a blank time may be given until the pressure-feed method proceeds after another subsequent pocket communicates with the first particle line at the lower end side of the first vertical pipe 130 due to the rotation of the rotation shaft. In this case, a first input opening and closing valve for opening and closing the first particle line may be provided between the 1-1 pressure-feed module 120 and the first vertical pipe 130, a first input return line connecting the first particle line and the first input hopper 111 may be provided between the 1-1 pressure-feed module 120 and the first input opening and closing valve, and the first input return valve may be provided on the first input return line.

Then, when one pocket starts to communicate with the first particle line due to the rotation of the rotation shaft, some particles are transferred by the suction-feed 1 method by closing or sealing the first input return line by the first input return valve, opening the first particle line by the first input opening and closing valve, and operating the first vacuum ejector 143 of the first measuring module 140. Subsequently, the remaining particles are transferred by the pressure-feed method using the 1-1 pressure-feed module 120 in the state of closing or sealing the first input return line by the first input return valve and opening the first particle line by the first input opening and closing valve.

Then, when the 1-1 pressure-feed module 120 is stopped in a state of continuously communicating one pocket with the first particle line, closing or sealing the first particle line by the first input opening and closing valve, and opening the first input return line by the first input return value, the particles and the gas between the first input valve 114 and the first input opening and closing valve are transferred to the first input hopper 111 through the first input return line by the pressure remaining on the first particle line. In addition, when the first vacuum ejector 143 is operated in a state of continuously communicating one pocket with the first particle line, closing or sealing the first particle line by the first input opening and closing valve, and opening the first input return line by the first input return valve, the suction force in the first vertical pipe 130 can be increased.

In addition, when another subsequent pocket starts to communicate with the first particle line due to the rotation of the rotation shaft, the above-described operation is repeatedly performed.

Since the plurality of pockets disposed at equal intervals in the circumferential direction about the intermittently-rotated rotation shaft are provided on the first measuring valve 144, the predetermined amount of particles may be accommodated in the corresponding pocket. The predetermined amount of particles may be stored in one pocket of the first measuring valve 144 in correspondence to the first information. The capacity of one pocket of the first measuring valve 144 may variously vary depending on the transfer speed of the particle and the unit transfer amount of the particles in correspondence to the first information.

Since the 1-2 pressure-feed module 150 supplies the process gas or the compressed air generated from the system to the particles intermittently discharged from the first measuring hopper 141 of the first measuring module 140, the 1-2 pressure-feed module 150 may stably press the particles in the first particle line.

In order to adjust the internal pressure of the first particle line, a vent for discharging the gas between the first measuring valve 144 and the 1-2 pressure-feed module 150 or allowing external gas to be injected therethrough may be provided between the first measuring valve 144 of the first measuring module 140 and the 1-2 pressure-feed module 150.

Second, the second transfer unit 200 may transfer particle in a second vertical pipe 230 in two stages.

More specifically, when the particles in the second transfer unit 200 move up in the second vertical pipe 230 formed to extend in a height direction, some particles in the second transfer information may pass through the second vertical pipe 230 by the suction-feed method using the suction force acting on an upper end side of the second vertical pipe 230. Next, the remaining particles in the second transfer information may pass through the second vertical pipe 230 by the pressure-feed method using the pressure acting on a lower end side of the second vertical pipe 230.

As described above, since the particles transferred in the second transfer unit 200 pass through the second vertical pipe 230 by sequentially applying the suction-feed method and the pressure-feed method to the second vertical pipe 230, it is possible to allow the particles to completely pass through the second vertical pipe 230, prevent the particles from stagnating in the second vertical pipe 230, and prevent the second vertical pipe 230 from being clogged by the particles.

The second transfer unit 200 may be operated in four methods as follows.

In a first example, the second transfer unit 200 may employ a method of sequentially transferring the particles to the second input module 210 and a second measuring module 240.

The second transfer unit 200 may include a second input module 210 in which the particles are stored and for measuring the particles with the second transfer information and discharging the measured particles, a 2-1 pressure-feed module 220 for pressing the particles discharged from the second input module 210 using a process gas or compressed air so that the particles discharged from the second input module 210 are transferred by the pressure-feed method using the pressure, the second vertical pipe 230 formed to extend in the height direction to form a path through which the particles discharged from the second input module 210 move up, a second measuring module 240 for suctioning and storing the particles discharged from the second input module 210 using the process gas or the compressed air or the particles in the second vertical pipe 230 so that the particles discharged from the second input module 210 are transferred by the suction-feed method using the suction force and then measuring the particles with the second information and discharging the measured particles using a rotary valve method, and a 2-2 pressure-feed module 250 for pressing the particles discharged from the second measuring module 240 using the process gas or the compressed air so that the particles discharged from the second measuring module 240 are transferred by the pressure-feed method using the pressure.

In this case, the 2-1 pressure-feed module 220 is connected to the lower end side of the second vertical pipe 230 with respect to the second vertical pipe 230, and the second input module 210 is connected to the 2-1 pressure-feed module 220. In addition, the second measuring module 240 is connected to the upper end side of the second vertical pipe 230 with respect to the second vertical pipe 230, and the 2-2 pressure-feed module 250 is connected to the second measuring module 240.

The second input module 210 may include a second input hopper 211 in which the particles are stored, a second magnet filter 212 for filtering magnetic foreign substances from the particles when the particles are input to the second input hopper 211, a second mesh filter 213 for filtering non-magnetic foreign substances from the particles when the particles are input to the second input hopper 211, and a second input valve 214 for measuring the particles stored in the second input hopper 211 with the second transfer information and discharging the measured particles using a rotary valve method.

The second input hopper 211 may accommodate all of the particles stored in the particle bag, which are transferred from the outside through the particle transfer module 410. A capacity of the second input hopper 211 may variously vary depending on the transfer speed of the particle and the unit transfer amount of the particle.

The second magnet filter 212 and the second mesh filter 213 may be spaced apart from each other and disposed on an upper end of the second input hopper 211 to filter foreign substances from the particles supplied from the particle bag.

In one embodiment of the present invention, since the second mesh filter 213 is disposed above the second magnet filter 212, it is possible to provide the crushing effect of the agglomerated particles, restore sizes of the agglomerated particles to original sizes, and improve the effect of filtering the magnetic foreign substances from the particles transferred from the particle bag.

Since a plurality of pockets disposed at equal intervals in a circumferential direction about an intermittently-rotated rotation shaft are provided on the second input valve 214, a predetermined amount of particles may be accommodated in the corresponding pocket. The predetermined amount of particles may be accommodated in one pocket of the second input valve 214 in correspondence to the second transfer information. A capacity of one pocket of the second input valve 214 may variously vary depending on the transfer speed of the particle and the unit transfer amount of the particles in correspondence to the second transfer information.

Since the 2-1 pressure-feed module 220 supplies the process gas or the compressed air generated from the system to the particles intermittently discharged from the second input hopper 211 of the second input module 210, the 2-1 pressure-feed module 220 may stably press the particles in the second particle line.

In order to adjust an internal pressure of the second particle line, a vent for discharging the gas between the second input valve 214 and the 2-1 pressure-feed module 220 or allowing external gas to be injected therethrough may be provided between the second input valve 214 of the second input module 210 and the 2-1 pressure-feed module 220.

The second vertical pipe 230 forms a part of the second particle line of the particle transfer line. The second vertical pipe 230 forms a path through which the particles move up in the height direction of the system on the second particle line. The second vertical pipe 230 may be formed to extend in the height direction of the system.

The second measuring module 240 may include a second measuring hopper 241 in which the particles transferred through the second vertical pipe 230 are stored, a second vacuum ejector 243 for suctioning the particles discharged from the second input module 210 by the suction-feed method using the suction force and transferring the particles to the second measuring hopper 241, and a second measuring valve 244 for measuring the particles stored in the second measuring hopper 241 with the second information and discharging the measured particles using a rotary valve method.

The second measuring hopper 241 may sequentially accommodate the particles transferred through the 2-1 pressure-feed module 220. A capacity of the second measuring hopper 241 may variously vary depending on the transfer speed of the particle and the unit transfer amount of the particle.

A second air unit 242 for dispersing the particles accommodated in the second measuring hopper 241 using the process gas may be provided on the second measuring hopper 241. The second air unit 242 may inject the process gas into the second measuring hopper 241, thereby preventing the agglomeration of the particles accommodated in the second measuring hopper 241. In order to adjust an internal pressure of the second measuring hopper 241, a vent for discharging the gas of the second measuring hopper 241 or allowing external gas to be injected therethrough may be provided on the second measuring hopper 241.

The second vacuum ejector 243 may include the vacuum tank part 420 of which an inside is maintained in a vacuum state by the process gas or the compressed air, the vacuum head part 430 for generating the suction force as the process gas or the compressed air are input to maintain the inside of the vacuum tank part 420 in the vacuum state, the particle input part 440 to which the second vertical pipe 230 is connected so that the second vertical pipe 230 and the vacuum tank part 420 communicate with each other, the connection valve part 450 for opening or closing the vacuum tank part 420 and the second measuring hopper 241 to communicate or not communicate with each other, and the control unit 460 for controlling the operation relationships between the second input module 210, the 2-1 pressure-feed module 220, and the vacuum head part 430.

The second vacuum ejector 243 has the same configuration as the first vacuum ejector 143 and is given the same reference numeral.

It is preferable that the vacuum tank part 420 have a cylindrical shape to support the suction force. Since the vacuum jacket part 421 surrounds and supports the vacuum tank part 420, it is possible to prevent the deformation of the vacuum tank part 420 and protect the vacuum tank part 420.

It is advantageous that the vacuum head part 430 is provided on the upper end of the vacuum tank part 420. The gas injection portion 431 through which the process gas or the compressed air are injected may be provided on the vacuum head part 430, and the gas discharge portion spaced apart from the gas injection portion 431 and through which the process gas generated by generating the suction force are discharged may be provided on the vacuum head part 430.

The Venturi portion (not illustrated) for providing the suction force to the particles using the Venturi effect using the process gas or the compressed air may be provided on the vacuum head part 430 to stabilize the suction-feed of the particles and simply adjust the suction-feed period.

The particle input part 440 may be provided on the side surface of the vacuum tank part 420 or the upper end of the vacuum tank part 420 to smoothly transfer the particles from the second vertical pipe 230.

It is advantageous that the connection valve part 450 is provided on the lower end of the vacuum tank part 420. The connection valve part 450 may include the vacuum buffer portion provided on the lower end of the vacuum tank part 420 to maintain the vacuum state of the vacuum tank part 420, the valve body portion 451 provided on the lower end of the vacuum buffer portion and configured to communicate with the second measuring hopper 241 of the second measuring module 240, the valve opening and closing portion provided on the valve body portion 451 to open and close the valve body portion 451 or adjust the opening of the valve body portion 451, and the opening and closing driving portion 452 for operating the valve opening and closing portion.

As the particles are discharged from the second input module 210, the control unit 460 may operate the vacuum head part 430 in a state of stopping the 2-1 pressure-feed module 220 so that some particles pass through the second vertical pipe 230 by the suction-feed method using the suction force, and then operate the 2-1 pressure-feed module 220 together with the stop of the vacuum head part 430 so that the remaining particles pass through the second vertical pipe 230 by the pressure-feed method using the pressure, thereby stably discharging the particles from the second vertical pipe 230.

More specifically, an operation of the control unit 460 will be described as follows.

When one pocket communicates with the second particle line due to the rotation of a rotation shaft of the second input valve 214, the particle transfer by the suction-feed method, the particle transfer by the pressure-feed method, and the return of the particles and the gas by the remaining pressure are sequentially performed.

After all of the particles pass through the second vertical pipe 230 by the pressure through the 2-1 pressure-feed module 220, a blank time may be given until the pressure-feed method proceeds after another subsequent pocket communicates with the second particle line at the lower end side of the second vertical pipe 230 due to the rotation of the rotation shaft. In this case, a second input opening and closing valve for opening and closing the second particle line may be provided between the 2-1 pressure-feed module 220 and the second vertical pipe 230, a second input return line connecting the second particle line and the second input hopper 211 may be provided between the 2-1 pressure-feed module 220 and the second input opening and closing valve, and the second input return valve may be provided on the second input return line.

Then, when one pocket starts to communicate with the second particle line due to the rotation of the rotation shaft, some particles are transferred by the suction-feed method by closing or sealing the second input return line by the second input return valve, opening the second particle line by the second input opening and closing valve, and operating the second vacuum ejector 243 of the second measuring module 240. Subsequently, the remaining particles are transferred by the pressure-feed method using the 2-1 pressure-feed module 220 in the state of closing or sealing the second input return line by the second input return valve and opening the second particle line by the second input opening and closing valve.

Then, when the 2-1 pressure-feed module 220 is stopped in a state of continuously communicating one pocket with the second particle line, closing or sealing the second particle line by the second input opening and dosing valve, and opening the second input return line by the second input return value, the particles and the gas between the second input valve 214 and the second input opening and dosing valve are transferred to the second input hopper 211 through the second input return line by the remaining pressure. In addition, when the second vacuum ejector 243 is operated in a state of continuously communicating one pocket with the second particle line, closing or sealing the second particle line by the second input opening and closing valve, and opening the second input return line by the second input return valve, the suction force in the second vertical pipe 230 can be increased.

In addition, when another subsequent pocket starts to communicate with the second particle line due to the rotation of the rotation shaft, the above-described operation is repeatedly performed.

Since the plurality of pockets disposed at equal intervals in the circumferential direction about the intermittently-rotated rotation shaft are provided on the second measuring valve 244, a predetermined amount of particles may be accommodated in the corresponding pocket. The predetermined amount of particles may be accommodated in one pocket of the second measuring valve 244 in correspondence to the second information. A capacity of one pocket of the second measuring valve 244 may variously vary depending on the transfer speed of the particle and the unit transfer amount of the particles in correspondence to the second information.

Since the 2-2 pressure-feed module 250 supplies the process gas or the compressed air generated from the system to the particles intermittently discharged from the second measuring hopper 241 of the second measuring module 240, the 2-2 pressure-feed module 250 may stably press the particles in the second particle line.

In order to adjust the internal pressure of the second particle line, a vent for discharging the gas between the second measuring valve 244 and the 2-2 pressure-feed module 250 or allowing external gas to be injected therethrough may be provided between the second measuring valve 244 of the second measuring module 240 and the 2-2 pressure-feed module 250.

In a second example, the second transfer unit 200 may employ a method of sequentially transferring the particles to the second input module 210 and a silo module 260.

The second transfer unit 200 may include the second input module 210 in which the particles are stored and which measures the particles with the second transfer information and discharges the measured particles, the 2-1 pressure-feed module 220 for pressing the particles discharged from the second input module 210 using the process gas or the compressed air so that the particles discharged from the second input module 210 are transferred by the pressure-feed method using the pressure, the second vertical pipe 230 formed to extend in the height direction to form the path through which the particles discharged from the second input module 210 move up, the silo module 260 for suctioning and storing the particles discharged from the second input module 210 using the process gas or the compressed air or the particles in the second vertical pipe 230 so that the particles discharged from the second input module 210 are transferred by the suction-feed method using the suction force and then measuring the particles with the second information and discharging the particles using a feeding method, and a silo pressure-feed module 270 for pressing the particles discharged from the silo module 260 using the process gas or the compressed air so that the particles discharged from the silo module 260 are transferred by the pressure-feed method using the pressure.

In this case, the 2-1 pressure-feed module 220 is connected to the lower end side of the second vertical pipe 230 with respect to the second vertical pipe 230, and the second input module 210 is connected to the 2-1 pressure-feed module 220. In addition, the silo module 260 is connected to the upper end side of the second vertical pipe 230 with respect to the second vertical pipe 230, and the silo pressure-feed module 270 is connected to the silo module 260.

The second input module 210 may include the second input hopper 211 in which the particles are stored, the second magnet filter 212 for filtering magnetic foreign substances from the particles when the particles are input to the second input hopper 211, the second mesh filter 213 for filtering non-magnetic foreign substances from the particles when the particles are input to the second input hopper 211, and the second input valve 214 for measuring the particles stored in the second input hopper 211 with the second transfer information and discharging the measured particles using a rotary valve method.

The second input hopper 211 may accommodate all of the particles stored in the particle bag, which are transferred from the outside through the particle transfer module 410. The capacity of the second input hopper 211 may variously vary depending on the transfer speed of the particle and the unit transfer amount of the particle.

The second magnet filter 212 and the second mesh filter 213 may be spaced apart from each other and disposed on the upper end of the second input hopper 211 to filter foreign substances from the particles supplied from the particle bag.

In one embodiment of the present invention, since the second mesh filter 213 is disposed above the second magnet filter 212, it is possible to provide the crushing effect of the agglomerated particles, restore sizes of the agglomerated particles to original sizes, and improve the effect of filtering the magnetic foreign substances from the particles transferred from the particle bag.

Since the plurality of pockets disposed at equal intervals in the circumferential direction about the intermittently-rotated rotation shaft are provided on the second input valve 214, a predetermined amount of particles may be accommodated in the corresponding pocket. The predetermined amount of particles may be accommodated in one pocket of the second input valve 214 in correspondence to the second transfer information. A capacity of one pocket of the second input valve 214 may variously vary depending on the transfer speed of the particle and the unit transfer amount of the particles in correspondence to the second transfer information.

Since the 2-1 pressure-feed module 220 supplies the process gas or the compressed air generated from the system to the particles intermittently discharged from the second input hopper 211 of the second input module 210, the 2-1 pressure-feed module 220 may stably press the particles in the second particle line.

In order to adjust an internal pressure of the second particle line, a vent for discharging the gas between the second input valve 214 and the 2-1 pressure-feed module 220 or allowing external gas to be injected therethrough may be provided between the second input valve 214 of the second input module 210 and the 2-1 pressure-feed module 220.

The second vertical pipe 230 forms a part of the second particle line of the particle transfer line. The second vertical pipe 230 forms a path through which the particles move up in the height direction of the system on the second particle line. The second vertical pipe 230 may be formed to extend in the height direction of the system.

The silo module 260 may include a particle silo 261 in which the particles transferred through the second vertical pipe 230 are stored, a silo vacuum ejector 262 for suctioning the particles discharged from the second input module 210 by the suction-feed method using the suction force and transferring the particles to the particle silo 261, and a table feeder 263 for measuring the particles stored in the body silo with the second information and discharging the measured particles using the feeding method.

The particle silo 261 may sequentially accommodate the particles transferred through the 2-1 pressure-feed module 220. The particle silo 261 accommodates the particles accommodated in a plurality of particle bags.

The process gas may be injected into the particle silo 261 to disperse the particles accommodated in the particle silo 261. The process gas injected into the particle silo 261 can prevent the agglomeration of the particles accommodated in the particle silo 261. In order to adjust an internal pressure of the particle silo 261, a vent for discharging the gas of the particle silo 261 or allowing external gas to be injected therethrough may be provided on the particle silo 261.

The silo vacuum ejector 262 may include the vacuum tank part 420 of which an inside is maintained in the vacuum state by the process gas or the compressed air, the vacuum head part 430 for generating the suction force as the process gas or the compressed air are input to maintain the inside of the vacuum tank part 420 in the vacuum state, the particle input part 440 to which the second vertical pipe 230 is connected so that the second vertical pipe 230 and the vacuum tank part 420 communicate with each other, the connection valve part 450 for opening or closing the vacuum tank part 420 and the particle silo 261 to communicate or not communicate with each other, and the control unit 460 for controlling the operation relationships between the second input module 210, the 2-1 pressure-feed module 220, and the vacuum head part 430.

The silo vacuum ejector 262 has the same configuration as the first vacuum ejector 143 and is given the same reference numeral.

It is preferable that the vacuum tank part 420 have a cylindrical shape to support the suction force. Since the vacuum jacket part 421 surrounds and supports the vacuum tank part 420, it is possible to prevent the deformation of the vacuum tank part 420 and protect the vacuum tank part 420.

It is advantageous that the vacuum head part 430 is provided on the upper end of the vacuum tank part 420. The gas injection portion 431 through which the process gas or the compressed air are injected may be provided on the vacuum head part 430, and the gas discharge portion spaced apart from the gas injection portion 431 and through which the process gas generated by generating the suction force are discharged may be provided on the vacuum head part 430.

The Venturi portion (not illustrated) for providing the suction force to the particles using the Venturi effect using the process gas or the compressed air may be provided on the vacuum head part 430 to stabilize the suction-feed of the particles and simply adjust the suction-feed period thereof.

The particle input part 440 may be provided on the side surface of the vacuum tank part 420 or the upper end of the vacuum tank part 420 to smoothly transfer the particles from the second vertical pipe 230.

It is advantageous that the connection valve part 450 is provided on the lower end of the vacuum tank part 420. The connection valve part 450 may include the vacuum buffer portion provided on the lower end of the vacuum tank part 420 to maintain the vacuum state of the vacuum tank part 420, the valve body portion 451 provided on the lower end of the vacuum buffer portion and configured to communicate with the particle silo 261 of the silo module 260, the valve opening and closing portion provided on the valve body portion 451 to open and close the valve body portion 451 or adjust the opening of the valve body portion 451, and the opening and closing driving portion 452 for operating the valve opening and closing portion.

As the particles are discharged from the second input module 210, the control unit 460 may operate the vacuum head part 430 in the state of stopping the 2-1 pressure-feed module 220 so that some particles pass through the second vertical pipe 230 by the suction-feed method using the suction force, and then operate the 2-1 pressure-feed module 220 together with the stop of the vacuum head part 430 so that the remaining particles pass through the second vertical pipe 230 by the pressure-feed method using the pressure, thereby stably discharging the particles from the second vertical pipe 230.

More specifically, an operation of the control unit 460 will be described as follows.

When one pocket communicates with the second particle line due to the rotation of the rotation shaft of the second input valve 214, the particle transfer by the suction-feed method, the particle transfer by the pressure-feed method, and the return of the particles and the gas by the remaining pressure are sequentially performed.

After all of the particles pass through the second vertical pipe 230 by the pressure through the 2-1 pressure-feed module 220, a blank time may be given until the pressure-feed method proceeds after another subsequent pocket may communicate with the second particle line at the lower end side of the second vertical pipe 230 due to the rotation of the rotation shaft. In this case, the second input opening and closing valve for opening and closing the second particle line may be provided between the 2-1 pressure-feed module 220 and the second vertical pipe 230, the second input return line connecting the second particle line and the second input hopper 211 may be provided between the 2-1 pressure-feed module 220 and the second input opening and closing valve, and the second input return valve may be provided on the second input return line.

Then, when one pocket starts to communicate with the second particle line due to the rotation of the rotation shaft, some particles are transferred by the suction-feed method by dosing or sealing the second input return line by the second input return valve, opening the second particle line by the second input opening and dosing valve, and operating the second vacuum ejector 243 of the second measuring module 240. Subsequently, the remaining particles are transferred by the pressure-feed method using the 2-1 pressure-feed module 220 in the state of dosing or sealing the second input return line by the second input return valve and opening the second particle line by the second input opening and dosing valve.

Then, when the 2-1 pressure-feed module 220 is stopped in a state of continuously communicating one pocket with the second particle line, closing or sealing the second particle line by the second input opening and closing valve, and opening the second input return line by the second input return value, the particles and the gas between the second input valve 214 and the second input opening and closing valve are transferred to the second input hopper 211 through the second input return line by the remaining pressure. In addition, when the second vacuum ejector 243 is operated in a state of continuously communicating one pocket with the second particle line, closing or sealing the second particle line by the second input opening and closing valve, and opening the second input return line by the second input return valve, the suction force in the second vertical pipe 230 can be increased.

In addition, when another subsequent pocket starts to communicate with the second particle line due to the rotation of the rotation shaft, the above-described operation is repeatedly performed.

The table feeder 263 may include a first feeder valve part provided on a lower end of the particle silo 261, a particle storage provided on a lower end of the feeder valve part and in which the particles are stored in correspondence to the second information, and a second feeder valve part provided on a lower end of the particle storage.

Then, when the first feeder valve part is opened in a state of closing or sealing the lower end of the particle storage by the second feeder valve part, the particles in the particle silo 261 are moved to the particle storage, and the particles corresponding to the second information are accommodated in the particle storage. When the second feeder valve part is opened in a state of closing or sealing the first feeder valve part, the particles accommodated in the particle storage may be transferred to the second particle line in correspondence to the second information. In addition, after closing or sealing the second feeder valve part, the particles in the second particle line may be transferred to the silo pressure-feed module 270 by the pressure-feed method.

Since the silo pressure-feed module 270 supplies the process gas or the compressed air generated from the system to the particles intermittently discharged from the particle silo 261 of the silo module 260, the silo pressure-feed module 270 may stably press the particles in the second particle line.

In order to adjust the internal pressure of the second particle line, a vent for discharging the gas between the table feeder 263 and the silo pressure-feed module 270 or allowing external gas to be injected therethrough may be provided between the table feeder 263 of the silo module 260 and the silo pressure-feed module 270.

In a third example, the second transfer unit 200 may employ a method of sequentially transferring the particles to the silo module 260 and the second measuring module 240.

The second transfer unit 200 may include the silo module 260 in which the particles are stored and which measures the particles with the second transfer information and discharges the measured particles using the feeding method, the silo pressure-feed module 270 for pressing the particles discharged from the silo module 260 using the process gas or the compressed air so that the particles discharged from the second measuring module 240 are transferred by the pressure-feed method using the pressure, the second vertical pipe 230 formed to extend in the height direction to form the path through which the particles discharged from the silo module 260 move up, the second measuring module 240 for suctioning and storing the particles discharged from the silo module 260 using the process gas or the compressed air or the particles in the second vertical pipe 230 so that the particles discharged from the silo module 260 are transferred by the suction-feed method using the suction force and then measuring the particles with the second information and discharging the measured particles using a rotary valve method, and the 2-2 pressure-feed module 250 for pressing the particles discharged from the second measuring module 240 using the process gas or the compressed air so that the particles discharged from the second measuring module 240 are transferred by the pressure-feed method using the pressure.

In this case, the silo pressure-feed module 270 is connected to the lower end side of the second vertical pipe 230 with respect to the second vertical pipe 230, and the silo module 260 is connected to the silo pressure-feed module 270. In addition, the second measuring module 240 is connected to the upper end side of the second vertical pipe 230 with respect to the second vertical pipe 230, and the 2-2 pressure-feed module 250 is connected to the second measuring module 240.

The silo module 260 may include the particle silo 261 in which the particles transferred through the second vertical pipe 230 are stored, and the table feeder 263 for measuring the particles stored in the body silo with the second information and discharging the measured particles using the feeding method.

The silo module 260 may further include a silo magnet filter for filtering magnetic foreign substances from the particles when the particles are input to the particle silo 261, and a silo mesh filter for filtering non-magnetic foreign substances from the particles when the particles are input to the particle silo 261.

In the third example, it is preferable that the silo vacuum ejector 262 be omitted from the silo module 260.

The particle silo 261 may accommodate all of the particles stored in the particle bag, which are transferred from the outside through the particle transfer module 410. The particle silo 261 accommodates the particles accommodated in the plurality of particle bags.

The process gas may be injected into the particle silo 261 to disperse the particles stored in the particle silo 261. The process gas injected into the particle silo 261 can prevent the agglomeration of the particles accommodated in the particle silo 261. In order to adjust the internal pressure of the particle silo 261, a vent for discharging the gas of the particle silo 261 or allowing external gas to be injected therethrough may be provided on the particle silo 261.

The silo magnet filter and the silo mesh filter may be spaced apart from each other and disposed on the upper end of the particle silo 261 to filter foreign substances from the particles supplied from the powder bags.

In one embodiment of the present invention, since the silo mesh filter is disposed above the silo magnet filter, it is possible to provide the crushing effect of the agglomerated particles, restore sizes of the agglomerated particles to original sizes, and improve the effect of filtering the magnetic foreign substances from the particles transferred from the particle bags.

The table feeder 263 may include the first feeder valve part provided on the lower end of the particle silo 261, the particle storage provided on the lower end of the feeder valve part and in which the particles are accommodated in correspondence to the second transfer information, and the second feeder valve part provided on the lower end of the particle storage.

Then, when the first feeder valve part is opened in the state of closing or sealing the lower end of the particle storage by the second feeder valve part, the particles in the particle silo 261 are moved to the particle storage, and the particles corresponding to the second transfer information are accommodated in the particle storage. When the second feeder valve part is opened in the state of closing or sealing the first feeder valve part, the particles accommodated in the particle storage may be transferred to the second particle line in correspondence to the second transfer information. In addition, after closing or sealing the second feeder valve part, the particles in the second particle line may be transferred to the silo pressure-feed module 270 by the pressure-feed method.

Since the silo pressure-feed module 270 supplies the process gas or the compressed air generated from the system to the particles intermittently discharged from the particle silo 261 of the silo module 260 the silo pressure-feed module 270 may stably press the particles in the second particle line.

In order to adjust the internal pressure of the second particle line, a vent for discharging the gas between the table feeder 263 and the silo pressure-feed module 270 or allowing external gas to be injected therethrough may be provided between the table feeder 263 of the silo module 260 and the silo pressure-feed module 270.

The second vertical pipe 230 forms a part of the second particle line of the particle transfer line. The second vertical pipe 230 forms the path through which the particles move up in the height direction of the system on the second particle line. The second vertical pipe 230 may be formed to extend in the height direction of the system.

The second measuring module 240 may include the second measuring hopper 241 in which the particles transferred through the second vertical pipe 230 are stored, the second vacuum ejector 243 for suctioning the particles discharged from the second input module 210 by the suction-feed method using the suction force and transferring the particles to the second measuring hopper 241, and the second measuring valve 244 for measuring the particles stored in the second measuring hopper 241 with the second information and discharging the measured particles using a rotary valve method.

The second measuring hopper 241 may sequentially accommodate the particles transferred through the silo pressure-feed module 270. A capacity of the second measuring hopper 241 may variously vary depending on the transfer speed of the particle and the unit transfer amount of the particle.

The second air unit 242 for dispersing the particles accommodated in the second measuring hopper 241 using the process gas may be provided on the second measuring hopper 241. The second air unit 242 may inject the process gas into the second measuring hopper 241, thereby preventing the agglomeration of the particles accommodated in the second measuring hopper 241. In order to adjust the internal pressure of the second measuring hopper 241, a vent for discharging the gas of the second measuring hopper 241 or allowing external gas to be injected therethrough may be provided on the second measuring hopper 241.

The second vacuum ejector 243 may include the vacuum tank part 420 of which an inside is maintained in the vacuum state by the process gas or the compressed air, the vacuum head part 430 for generating the suction force as the process gas or the compressed air are input to maintain the inside of the vacuum tank part 420 in the vacuum state, the particle input part 440 to which the second vertical pipe 230 is connected so that the second vertical pipe 230 and the vacuum tank part 420 communicate with each other, the connection valve part 450 for opening or closing the vacuum tank part 420 and the second measuring hopper 241 to communicate or not communicate with each other, and the control unit 460 for controlling operation relationships between the silo module 260, the silo pressure-feed module 270, and the vacuum head part 430.

The second vacuum ejector 243 has the same configuration as the first vacuum ejector 143 and is given the same reference numeral.

It is preferable that the vacuum tank part 420 have a cylindrical shape to support the suction force. Since the vacuum jacket part 421 surrounds and supports the vacuum tank part 420, it is possible to prevent the deformation of the vacuum tank part 420 and protect the vacuum tank part 420.

It is advantageous that the vacuum head part 430 is provided on the upper end of the vacuum tank part 420. The gas injection portion 431 through which the process gas or the compressed air are injected may be provided on the vacuum head part 430, and the gas discharge portion spaced apart from the gas injection portion 431 and through which the process gas generated by generating the suction force are discharged may be provided on the vacuum head part 430.

The Venturi portion (not illustrated) for providing the suction force to the particles using the Venturi effect using the process gas or the compressed air may be provided on the vacuum head part 430 to stabilize the suction-feed of the particles and simply adjust the suction-feed period.

The particle input part 440 may be provided on the side surface of the vacuum tank part 420 or the upper end of the vacuum tank part 420 to smoothly transfer the particles from the second vertical pipe 230.

It is advantageous that the connection valve part 450 is provided on the lower end of the vacuum tank part 420. The connection valve part 450 may include the vacuum buffer portion provided on the lower end of the vacuum tank part 420 to maintain the vacuum state of the vacuum tank part 420, the valve body portion 451 provided on the lower end of the vacuum buffer portion and configured to communicate with the second measuring hopper 241 of the second measuring module 240, the valve opening and dosing portion provided on the valve body portion 451 to open and close the valve body portion 451 or adjust the opening of the valve body portion 451, and the opening and closing driving portion 452 for operating the valve opening and closing portion.

As the particles are discharged from the silo module 260, the control unit 460 may operate the vacuum head part 430 in a state of stopping the silo pressure-feed module 270 so that some particles pass through the second vertical pipe 230 by the suction-feed method using the suction force, and then operate the silo pressure-feed module 270 together with the stop of the vacuum head part 430 so that the remaining particles pass through the second vertical pipe 230 by the pressure-feed method using the pressure, thereby stably discharging the particles from the second vertical pipe 230.

More specifically, an operation of the control unit 460 will be described as follows.

When the particle storage and the second particle line communicate with each other due to the opening of the second feeder valve part of the silo feeder, the particle transfer by the suction-feed method and the particle transfer by the pressure-feed method are sequentially performed.

After all of the particles pass through the second vertical pipe 230 by the pressure through the silo pressure-feed module 270, the second feeder valve part is opened, and thus the particle storage and the second vertical pipe 230 communicate with each other, and the particles are discharged to the second particle line. In this case, the input opening and closing valve for opening and closing the second particle line may be provided between the silo pressure-feed module 270 and the second vertical pipe 230.

Then, when the particles in the particle storage are discharged to the second particle line, some particles are transferred by the suction-feed method by opening the second particle line by the input opening and dosing valve and operating the second vacuum ejector 243 of the second measuring module 240. At this time, since all of the particles in the particle storage are discharged to the second particle line in the particle suction-feed process, the second feeder valve part is switched to a dosed or sealed state. Subsequently, the remaining particles are transferred by the pressure-feed method using the silo pressure-feed module 270 in the state in which the second particle line is opened by the input opening and closing valve and the second feeder valve part is closed or sealed.

Next, when the second particle line is closed or sealed by the input opening and closing valve together with the stop of the silo pressure-feed module 270 and the second feeder valve part is opened, the particles and the gas between the second feeder valve part and the input opening and closing valve may be transferred to the particle silo 261 by the remaining pressure, and when the second feeder valve part is closed or sealed and then the first feeder valve part is opened for a subsequent operation, subsequent particles may be input to the particle silo 261. In addition, when the second vacuum ejector 243 is operated in the state of closing or sealing the second particle line by the input opening and closing valve together with the stop of the silo pressure-feed module 270, it is possible to increase the suction force in the second vertical pipe 230.

Since the plurality of pockets disposed at equal intervals in the circumferential direction about the intermittently-rotated rotation shaft are provided on the second measuring valve 244, the predetermined amount of particles may be accommodated in the corresponding pocket. The predetermined amount of particles may be accommodated in one pocket of the second measuring valve 244 in correspondence to the second information. The capacity of one pocket of the second measuring valve 244 may variously vary depending on the transfer speed of the particle and the unit transfer amount of the particles in correspondence to the second information.

Since the 2-2 pressure-feed module 250 supplies the process gas or the compressed air generated from the system to the particles intermittently discharged from the second measuring hopper 241 of the second measuring module 240 the 2-2 pressure-feed module 250 may stably press the particles in the second particle line.

In order to adjust the internal pressure of the second particle line, a vent for discharging the gas between the second measuring valve 244 and the 2-2 pressure-feed module 250 or allowing external gas to be injected therethrough may be provided between the second measuring valve 244 of the second measuring module 240 and the 2-2 pressure-feed module 250.

In a fourth example, the second transfer unit 200 may employ a method of sequentially transferring the particles to the second input module 210, the silo module 260, and the second measuring module 240. In this case, the second vertical pipe 230 may be classified into a 2-1 vertical pipe and a 2-2 vertical pipe.

The second transfer unit 200 may include the second input module 210 in which the particles are stored and for measuring the particles with the second transfer information and discharging the measured particles, the 2-1 pressure-feed module 220 for pressing the particles discharged from the second input module 210 using the process gas or the compressed air so that the particles discharged from the second input module 210 are transferred by the pressure-feed method using the pressure, the 2-1 vertical pipe formed to extend in the height direction to form the path through which the particles discharged from the second input module 210 move up, the silo moddule 260 in which the particles are stored and for measuring the particles with the second transfer information and discharging the measured particles using the feeding method, the silo pressure-feed module 270 for pressing the particles discharged from the silo module 260 using the process gas or the compressed air so that the particles discharged from the silo module 260 are transferred by the pressure-feed method using the pressure, the 2-2 vertical pipe formed to extend in the height direction to form the path through which the particles discharged from the silo module 260 move up, the second measuring module 240 for suctioning and storing the particles discharged from the silo module 260 using the process gas or the compressed air or the particles in the second vertical pipe 230 so that the particles discharged from the silo module 260 are transferred by the suction-feed method using the suction force and then measuring the particles with the second information and discharging the measured particles using a rotary valve method, and the 2-2 pressure-feed module 250 for pressing the particles discharged from the second measuring module 240 using the process gas or the compressed air so that the particles discharged from the second measuring module 240 are transferred by the pressure-feed method using the pressure.

In this case, the 2-1 pressure-feed module 220 is connected to a lower end side of the 2-1 vertical pipe with respect to the 2-1 vertical pipe, and the second input module 210 is connected to the 2-1 pressure-feed module 220. In addition, the silo module 260 is connected to an upper end side of the 2-1 vertical pipe with respect to the 2-1 vertical pipe, and the silo pressure-feed module 270 is connected to the silo module 260. In addition, the silo pressure-feed module 270 is connected to a lower end side of the 2-2 vertical pipe with respect to the 2-2 vertical pipe, and the silo module 260 is connected to the silo pressure-feed module 270. In addition, the second measuring module 240 is connected to an upper end side of the 2-2 vertical pipe with respect to the 2-2 vertical pipe, and the 2-2 pressure-feed module 250 is connected to the second measuring module 240.

Then, since the structure and operation of the second transfer unit 200 according to the second example are applied to the particle transfer structure and the particle transfer relationship from the second input module 210 to the silo module 260 and the structure and operation of the second transfer unit 200 according to the third example are applied to the particle transfer structure and the particle transfer relationship from the silo module 260 to the 2-2 pressure-feed module 250, a description of the second transfer unit 200 according to the fourth example will be omitted.

However, the 2-1 vertical pipe forms a part of the second particle line of the particle transfer line. The 2-1 vertical pipe forms the path through which the particles move up in the height direction of the system on the second particle line. The 2-1 vertical pipe may be formed to extend in the height direction of the system.

In addition, the 2-2 vertical pipe is spaced apart from the 2-1 vertical pipe to form a part of the second particle line of the particle transfer line. The 2-2 vertical pipe forms the path through which the particles move up in the height direction of the system on the second particle line. The 2-2 vertical pipe may be formed to extend in the height direction of the system.

In addition, the particles discharged from the table feeder 263 according to the fourth example may be measured with the second transfer information and discharged. In addition, the second transfer unit 200 according to the fourth example may further include a connection pipe, a first three-way valve, and a second three-way valve. Both ends of the connection pipe are each connected to one of the upper end of the 2-1 vertical pipe and a middle of the 2-2 vertical pipe or connected to one of the upper end of the 2-1 vertical pipe and the upper end of the 2-2 vertical pipe. The first three-way valve is connected to the 2-1 vertical pipe, the connection pipe, and the second particle line connected to the silo vacuum ejector 262 of the silo module 260, and the second three-way valve is connected to the connection pipe, the 2-2 vertical pipe, and the second particle line connected to the second vacuum ejector 243 of the second measuring module 240.

Then, when the first three-way valve connects the 2-1 vertical pipe and the second particle line connected to the silo vacuum ejector 262 of the silo module 260 and the second three-way valve connects the 2-2 vertical pipe and the second particle line connected to the second vacuum ejector 243 of the second measuring module 240, a particle transfer structure may be shown that the particles according to the fourth example sequentially pass through the second input module 210, the silo module 260, and the second measuring module 240. In addition, when the first three-way valve connects the 2-1 vertical pipe and the connection pipe and the second three-way valve connects the connection pipe and the second particle line connected to the second vacuum ejector 243 of the second measuring module 240, a particle transfer structure may be shown that the particles according to the fourth example pass through the second input module 210 and the second measuring module 240 without passing through the silo module 260 like the particles according to the first example.

Third, the third transfer unit 300 may transfer particles in a third vertical pipe by the pressure-feed method.

The third transfer unit 300 may be used upon additionally inputting particles in correspondence to the particles transferred by any one of the first transfer unit 100 and the second transfer unit 200. The third transfer unit 300 may be used upon inputting the particles with the first transfer information or the second transfer information in correspondence to the maintenance of the first transfer unit 100 and the second transfer unit 200.

It is advantageous that the third transfer unit 300 is installed parallel to any one of the first transfer unit 100 and the second transfer unit 200.

The third transfer unit 300 may include a third input module 310 in which the particles are stored and for measuring the particles with the third transfer information and discharging the measured particles, and a third pressure-feed module 320 for pressing the particles discharged from the third input module 310 using the process gas or the compressed air so that the particles discharged from the third input module 310 are transferred by the pressure-feed method using the pressure.

The third input module 310 may include a third input hopper 311 in which the particles are stored, a third magnet filter 312 for filtering magnetic foreign substances from the particles when the particles are input to the third input hopper 311, a third mesh filter 313 for filtering non-magnetic foreign substances from the particles when the particles are input to the third input hopper 311, and a third input valve for measuring the particles stored in the third input hopper 311 with the third transfer information and discharging the measured particles using a rotary valve method.

The third input hopper 311 may accommodate all of the particles stored in the particle bag, which are transferred from the outside through the particle transfer module 410. Particles transferred separately may be accommodated in the third input hopper 311. A capacity of the third input hopper 311 may variously vary depending on the transfer speed of the particle and the unit transfer amount of the particles.

The third magnet filter 312 and the third mesh filter 313 may be spaced apart from each other and disposed on an upper end of the third input hopper 311 to filter foreign substances from the particles supplied from the particle bag.

In one embodiment of the present invention, since the third mesh filter 313 is disposed above the third magnet filter 312, it is possible to provide the crushing effect of the agglomerated particles, restore sizes of the agglomerated particles to original sizes, and improve the effect of filtering the magnetic foreign substances from the particles transferred from the particle bag.

Since the plurality of pockets disposed at equal intervals in the circumferential direction about the intermittently-rotated rotation shaft are provided on the third measuring valve, a predetermined amounts of particle may be accommodated in the corresponding pocket. The predetermined amount of particles may be accommodated in one pocket of the third input valve in correspondence to the third transfer information. A capacity of one pocket of the third input valve may variously vary depending on the transfer speed of the particle and the unit transfer amount of the particles in correspondence to the third transfer information.

Since the third pressure-feed module 320 supplies the process gas or the compressed air generated from the system to the particles intermittently discharged from the third input hopper 311 of the third input module 310, the third pressure-feed module 320 may stably press the particles in the third particle line.

In order to adjust an internal pressure of the third particle line, a vent for discharging the gas between the third input valve and the third pressure-feed module 320 or allowing external gas to be injected therethrough may be provided between the third input valve of the third input module 310 and the third pressure-feed module 320.

The third transfer unit 300 may further include the third vertical pipe formed to extend in the height direction to form a path through which the particles discharged from the third input module 310 move up. Since a height of the third vertical pipe is formed smaller than that of the first vertical pipe 130 or the second vertical pipe 230, the particles may also be transferred by only the third pressure-feed module 320.

However, the third vertical pipe forms a part of the third particle line of the particle transfer line. The third vertical pipe forms the path through which the particles move up in the height direction of the system on the third particle line. The third vertical pipe may be formed to extend in the height direction of the system.

The particle transfer system according to one embodiment of the present invention may further include a binder transfer unit 500 and a solvent transfer unit 600. In this case, the particles may be formed of an active material that is a raw material of the electrode.

The binder transfer unit 500 converts a binder to be mixed with the active material into a liquid solution in correspondence to binder transfer information and transfers the liquid solution.

The binder transfer unit 500 may include a binder input module 510 in which a binder is stored and for measuring the binder with the binder transfer information and discharging the measured binder, a binder pressure-feed module 520 for pressing the binder discharged from the binder input module 510 using a process gas or compressed air so that the binder discharged from the binder input module 510 are transferred by the pressure-feed method using the pressure, a binder mixing module 530 for mixing a solvent transferred through the solvent transfer unit 600 with the binder transferred through the binder pressure-feed module 520 to form a solution, a solution transfer module for pumping the solution, a solution hopper scale 560 in which the solution transferred from the solution transfer module is stored and through which a predetermined amount of the solution may be discharged in correspondence to solution transfer information, and a solution supply pump 570 for pumping the solution of the solution hopper scale 560 in correspondence to the solution transfer information.

The binder input module 510 may include a binder input hopper 511 in which the particles are stored, a binder magnet filter 512 for filtering magnetic foreign substances from the particles when the particles are input to the binder input hopper 511, a binder mesh filter 513 for filtering non-magnetic foreign substances from the particles when the particles are input to the binder input hopper 511, and a binder input valve 514 for measuring the particles stored in the binder input hopper 511 with the binder transfer information and discharging the measured particles using a rotary valve method.

The binder input hopper 511 may accommodate all of the binders stored in the binder bag, which are transferred from the outside through a binder transfer module. A capacity of the binder input hopper 511 may variously vary depending on a transfer speed of the binder and a unit transfer amount of the binder. Process gas or compressed air may be supplied to the binder input hopper 511 to stabilize a stored state of the binder.

The binder magnet filter 512 and the binder mesh filter 513 may be spaced apart from each other and disposed on an upper end of the binder input hopper 511 to filter foreign substances from the binder supplied from a binder bag.

In one embodiment of the present invention, since the binder mesh filter 513 is disposed above the binder magnet filter 512 and 541, it is possible to provide the crushing effect of the agglomerated binders, restore sizes of the agglomerated binders to original sizes, and improve the effect of filtering the magnetic foreign substances from the binders transferred from the binder bag.

Since the plurality of pockets disposed at equal intervals in the circumferential direction about the intermittently-rotated rotation shaft are provided on the binder input valve 514, a predetermined amount of particles may be accommodated in the corresponding pocket. The predetermined amount of binder may be stored in one pocket of the binder input valve 514 in correspondence to the binder transfer information. A capacity of one pocket of the binder input valve 514 may variously vary depending on the transfer speed of the binder and the unit transfer amount of the binder in correspondence to the binder transfer information.

Since the binder pressure-feed module 520 supplies the process gas or the compressed air generated from the system to the particles intermittently discharged from the binder input hopper 511 of the binder input module 510, the binders may be stably pressed in the binder transfer line.

In order to adjust an internal pressure of the binder transfer line, a vent for discharging the gas between the binder input valve 514 and the binder pressure-feed module 520 or allowing external gas to be injected therethrough may be provided between the binder input valve 514 and the binder pressure-feed module 520.

The solvent supplied through a mixing adjustment module 650 of the solvent transfer unit 600 is accommodated in the binder mixing module 530 together with the binder.

The binder mixing module 530 may include a binder mixer 531 in which each of the binder and the solvent is accommodated at a preset ratio, and a binder stirrer 532 for mixing the binder and the solvent while rotating inside the binder mixer 531 to form a liquid solution.

The binder mixing module 530 may further include a temperature controller 533 for receiving and heating the solvent or the solution from the binder mixer 531 and then supplying the solvent or the solution back to the binder mixer 531. The temperature controller 533 may receive chiller water transferred from a main process unit for forming an electrode with a slurry to adjust a concentration of the solution or a temperature of the temperature controller 533.

A binder vent part 580 through which gas of the binder mixer 531 are collected and discharged may be provided on the binder mixing module 530. Then, an internal pressure of the binder mixer 531 may be adjusted, and the solution can be stabilized. The binder vent part 580 may include a binder vent line 581 for connecting the binder mixer 531 and a separate storage space, a binder filter line 582 spaced apart from the binder vent line 581 to connect the binder mixer 531 and the binder vent line 581, and a binder vent filter 583 provided on the binder filter line 582 to filter the gas of the binder mixer 531.

In this case, since a binder opening and closing valve is provided on each of the binder vent line 581 and the binder filter line 582, a line through which the gas of the binder mixer 531 pass may be selected depending on whether the binder opening and closing valve is opened or closed.

The solution transfer module may include a solution transfer pump 542 for pumping the solution of the binder mixing module 530. Process gas or compressed air may be supplied to the solution transfer pump 542 to smoothly transfer the solution.

The solution transfer module may include at least any one of a solution magnet filter 541 for filtering magnetic foreign substances from the solution when the solution is transferred to the solution hopper scale 560, and a cobetter filter 543 for filtering non-magnetic foreign substances from the solution when the solution is transferred to the solution hopper scale. In one embodiment of the present invention, the solution magnet filter 541 may be provided between the binder mixing module 530 and the solution transfer pump 542 to prevent damage to the solution transfer pump 542 due to the magnetic foreign substances, and the cobetter filter 543 may be provided between the solution transfer pump 542 and the solution hopper scale 560 to prevent the foreign substances from being transferred to the solution hopper scale 560.

The cobetter filter 543 may be formed of the above-described mesh filter. The cobetter filter 543 may filter the non-magnetic foreign substances from the liquid solution.

The binder transfer unit 500 may further include a first solution line 501 for returning the solution, which is provided between the solution transfer pump 542 and the cobetter filter 543, to the binder mixing module 530. In addition, the solution may be transferred to the solution hopper scale 560 or transferred to the first solution line 501 according to an opening and closing operation of an opening and closing valve provided on each line or a solution three-way valve for connecting the solution transfer pump 542, the cobetter filter 543, and the first solution line 501.

The solution hopper scale 560 automatically measures an amount of the liquid solution. Compressed air or process gas may be supplied to the solution hopper scale 560 to stably maintain a mixed state of the solution. The solution hopper scale 560 may be formed to allow internal gas to be smoothly discharged therefrom. Solvent transferred through an auxiliary adjustment module 660 of the solvent transfer unit 600, which will be described below, may be supplied to the solution hopper scale 560. In addition to the solution hopper scale 560, the binder transfer unit 500 may further include a binder bulk transfer module for supplying the solution supplied to the mixing unit 900 to be described below back to the solution hopper scale 560.

The binder bulk transfer module may include a bulk binder 551 in which the residue of the solution supplied to a mixing unit 900 to be described below, and a binder bulk transfer pump 552 for supplying the solution of the bulk binder 551 to the solution hopper scale 560. The process gas or the compressed air may be supplied to the binder bulk transfer pump 552 to smoothly operate the binder bulk transfer pump 552.

The solution supply pump 570 may transfer the solution of the solution hopper scale 560 to the mixing unit 900 to be described below. The process gas or the compressed air may be supplied to the solution supply pump 570 to stably transfer the solution.

The binder transfer unit 500 may further include a second solution line 502 for returning the solution provided between the solution supply pump 570 and the mixing unit 900 to the solution hopper scale 560. The binder transfer unit 500 may further include a third solution line 503 for directly connecting the solution hopper scale 560 and the mixing unit 900 to be described below so that the solution discharged from the solution hopper scale 560 is directly transferred to the mixing unit 900 to be described below.

The solvent transfer unit 600 transfers the solvent for forming the solution by dissolving the binder in correspondence to the solvent transfer information.

The solvent transfer unit 600 may include a solvent tank 610 in which the solvent is stored, a solvent pumping module for pumping the solvent stored in the solvent tank 610, a mixing adjustment module 650 for adjusting the solvent mixed with the binders for dissolving the binders, and a slurry adjustment module 670 for adjusting the solvent mixed with the slurry for adjusting the concentration of the slurry for forming the electrodes.

The solvent tank 610 may be formed to allow internal gas to be smoothly discharged therefrom.

The solvent pumping module may include a solvent pump 640 for pumping the solvent of the solvent tank 610. The process gas or the compressed air may be supplied to the solvent pump 640 to smoothly transfer the solvent.

The solvent pumping module may further include at least any one of a solvent magnet filter 620 for filtering magnetic foreign substances from the solvent when pumping the solvent, and a solvent mesh filter 630 for filtering non-magnetic foreign substances from the solvent when pumping the solvent.

In one embodiment of the present invention, the solvent magnet filter 620 may be provided between the solvent tank 610 and the solvent pump 640 to prevent damage to the solvent pump 640 due to the magnetic foreign substances, and the solvent mesh filter 630 may be provided between the solvent magnet filter 620 and the solvent pump 640 to prevent the foreign substances from being transferred to the solvent pump 640.

Since the mixing adjustment module 650 adjusts an amount of the solvent transferred to the binder mixing module 530 of the binder transfer unit 500, it is possible to stabilize the dissolution of the binders.

Since the slurry adjustment module 670 adjusts the amount of the solvent delivered to the mixing unit 900 to be described below, it is possible to stabilize the slurry and adjust the concentration of the slurry.

The solvent transfer unit 600 may further include the auxiliary adjustment module 660 for adjusting the solvent transferred to at least any one of the conductive material transfer unit 700, which will be described below, the dispersant transfer unit 800, which will be described below, and the solution hopper scale 560 of the binder transfer unit 500.

The solvent discharged through the solvent pump 640 may be returned to the solvent tank 610 through a first solvent line 601 branched from the solvent transfer line.

The solvent discharged through the solvent pump 640 is transferred to at least any one of the mixing adjustment module 650, the auxiliary adjustment module 660, and the slurry adjustment module 670 through a second solvent line 602 connected to the solvent transfer line.

The solvent passing through the auxiliary adjustment module 660 is transferred to at least any one of the conductive material transfer unit 700, the dispersant transfer unit 800, and the solution hopper scale 560 of the binder transfer unit 500 through the third solvent line 603.

The above-described respective adjustment module may be provided with the adjustment valves to select whether to transfer the solvent or adjust the transfer amount of the solvent.

The compressed air may be supplied to the solvent passing through the above-described respective adjustment modules to smoothly transfer the solvent.

The particle transfer system according to one embodiment of the present invention may include at least any one of the conductive material transfer unit 700 and the dispersant transfer unit 800.

The conductive material transfer unit 700 may transfer the conductive material to be mixed with the slurry for forming the electrodes in correspondence to conductive material transfer information.

The conductive material transfer unit 700 may include a conductive material hopper scale 710 in which the conductive material is stored, and a conductive material supply pump 720 for pumping a predetermined amount of the conductive material stored in the conductive material hopper scale 710. The conductive material transfer line connects the conductive material hopper scale 710 and the conductive material supply pump 720.

In one embodiment of the present invention, the conductive material may be formed of a powder-type or fillet-type carbon nanotube.

The conductive material hopper scale 710 may store the entire conductive material stored in a conductive material bag transferred from the outside through a conductive material transfer module. A solvent is supplied to the conductive material hopper scale 710 in correspondence to conductive material adjustment information. The solvent transferred through the auxiliary adjustment module 660 of the solvent unit may be supplied to the conductive material hopper scale 710.

The conductive material hopper scale 710 automatically measures an amount of a liquid conductive material. Compressed air or process gas may be supplied to the conductive material hopper scale 710 to stably maintain a mixed state of the liquid conductive material. The conductive material hopper scale 710 may be formed to allow internal gas to be smoothly discharged therefrom.

In addition to the conductive material hopper scale 710, the conductive material transfer unit 700 may further include a conductive material bulk transfer module for supplying the liquid conductive material supplied to the mixing unit 900 to be described below back to the conductive material hopper scale 710.

The conductive material bulk transfer module may include a bulk conductive material 730 in which the residue of the liquid conductive material supplied to the mixing unit 900 to be described below, and a conductive material bulk transfer pump 740 for supplying the conductive material of the bulk conductive material 730 to the conductive material hopper scale 710. The process gas or the compressed air may be supplied to the conductive material bulk transfer pump 740 to smoothly operate the conductive material bulk transfer pump 740.

The conductive material supply pump 720 may transfer the conductive material of the conductive material hopper scale 710 to the mixing unit 900 to be described below. The process gas or the compressed air may be supplied to the conductive material supply pump 720 to stably transfer the liquid conductive material.

The conductive material transfer unit 700 may further include a first conductive material line 701 for returning the conductive material provided between the conductive material supply pump 720 and the mixing unit 900 to be described below to the conductive material hopper scale 710. The conductive material transfer unit 700 may further include a second conductive material line 702 for directly connecting the conductive material hopper scale 710 and the mixing unit 900 to be described below so that the conductive material discharged from the conductive material hopper scale 710 is directly transferred to the mixing unit 900 to be described below.

The dispersant transfer unit 800 may transfer the dispersant to be mixed with the slurry for forming the electrodes in correspondence to dispersant transfer information.

The dispersant transfer unit 800 may include a dispersant hopper scale 810 in which the dispersant is stored, and a dispersant supply pump 820 for pumping a predetermined amount of the dispersant stored in the dispersant hopper scale 810. The dispersant transfer line connects the dispersant hopper scale 810 and the dispersant supply pump 820.

A solvent is supplied to the dispersant hopper scale 810 in correspondence to dispersant adjustment information. The solvent transferred through the auxiliary adjustment module 660 of the solvent unit may be supplied to the dispersant hopper scale 810.

The dispersant hopper scale 810 automatically measures an amount of a liquid dispersant. Compressed air or process gas may be supplied to the dispersant 16 hopper scale 810 to stably maintain a mixed state of the liquid dispersant. The dispersant hopper scale 810 may be formed to allow internal gas to be smoothly discharged therefrom.

In addition to the dispersant hopper scale 810, the dispersant transfer unit 800 may further include a dispersant bulk transfer module for supplying the liquid dispersant supplied to the mixing unit 900 to be described below back to the dispersant hopper scale 810.

The dispersant bulk transfer module may include a bulk dispersant 830 in which the residue of the liquid dispersant supplied to the mixing unit 900 to be described below, and a dispersant bulk transfer pump 840 for supplying the dispersant of the bulk dispersant 830 to the dispersant hopper scale 810. The process gas or the compressed air may be supplied to the dispersant bulk transfer pump 840 to smoothly operate the dispersant bulk transfer pump 840.

The dispersant supply pump 820 may transfer the dispersant of the dispersant hopper scale 810 to the mixing unit 900 to be described below. The process gas or the compressed air may be supplied to the dispersant supply pump 820 to stably transfer the liquid conductive material.

The dispersant transfer unit 800 may further include a first dispersant line 801 for returning the dispersant provided between the dispersant supply pump 820 and the mixing unit 900 to be described below to the dispersant hopper scale 810. The dispersant transfer unit 800 may further include a second dispersant line 802 for directly connecting the dispersant hopper scale 810 and the mixing unit 900 to be described below so that the dispersant discharged from the dispersant hopper scale 810 is directly transferred to the mixing unit 900 to be described below.

The particle transfer system according to one embodiment of the present invention may further include the mixing unit 900.

The mixing unit 900 may mix the particles transferred through the particle transfer unit 400, the solution transferred through the binder transfer unit 500, and the solvent transferred through the slurry adjustment module 670 of the solvent transfer unit 600. The particles may be transferred from at least any one of the first transfer unit 100, the second transfer unit 200, and the third transfer unit 300. The mixing unit 900 may further mix at least any one of the conductive material transferred through the conductive material transfer unit 700 and the dispersant transferred through the dispersant transfer unit 800.

Here, the residue of the solution is stored in the bulk binder 551, the residue of the conductive material is stored in the bulk conductive material 730, and the residue of the dispersant is stored in the bulk dispersant 830.

The mixing unit 900 may include a slurry mixing module 910 for mixing at least the particles, the solution, and the solvent at a preset ratio to form the slurry.

The slurry mixing module 910 may include a slurry mixer 911 in which at least the particles, the solution, and the solvent is accommodated at the preset ratio, and a slurry stirrer 912 for mixing at least the particles, the solution, and the solvent while rotating inside the slurry mixer 911 to form a liquid slurry.

Compressed air or process gas may be supplied to the slurry mixer 911 to stabilize the formation of the slurry. A hydraulic pressure unit 913 may be provided on the slurry mixer 911 to stabilize operations of peripheral components.

A slurry vent part 980 through which the gas of the slurry mixer 911 are collected and discharged may be provided on the slurry mixing module 910. Then, an internal pressure of the slurry mixer 911 may be adjusted to stabilize the solution. The slurry vent part 980 may include a slurry vent line 981 for connecting the slurry mixer 911 and a separate storage space, a slurry filter line 982 spaced apart from the slurry vent line 981 to connect the slurry mixer 911 and the slurry vent line 981, and a slurry vent filter 983 provided on the slurry filter line 982 to filter the gas of the slurry mixer 911.

In this case, since a slurry opening and closing valve is provided on each of the slurry vent line 981 and the slurry filter line 982, a line through which the gas of the slurry mixer 911 pass may be selected depending on whether the slurry opening and closing valve is opened or closed.

The mixing unit 900 may further include a slurry transfer pump 930 for pumping the slurry of the slurry mixer 911. Process gas or compressed air may be supplied to the slurry transfer pump 930 to smoothly transfer the slurry.

The mixing unit 900 may include at least any one of a slurry magnet filter 920 for filtering magnetic foreign substances from the slurry when the slurry is discharged from the slurry mixer 911, and a slurry mesh filter 940 for filtering non-magnetic foreign substances from the slurry when the slurry is discharged from the slurry mixer 911. In one embodiment of the present invention, the slurry magnet filter 920 may be provided between the slurry mixer 911 and the slurry transfer pump 930 to prevent damage to the slurry transfer pump 930 due to the magnetic foreign substances, and the slurry mesh filter 940 may filter the slurry discharged from the slurry transfer pump 930 to prevent the foreign substances from being transferred to a subsequent process.

The mixing unit 900 can facilitate the attachment and detachment of the slurry mixer 911 through a maintenance module 950 and simplify the maintenance of the slurry mixer 911. The maintenance module 950 may be formed of a crane or a chain block.

The slurry passing through the mixing unit 900 is transferred to a subsequent process to be coated on a surface of a current collector.

Reference numeral 960 (not illustrated) denotes an electrolyte supply unit for supplying a preset amount of electrolyte to the mixing unit 900. Since the electrolyte supply unit 960 supplies the electrolyte to the slurry, it is possible to actively ionize the active material in the finally-completed electrode and prevent the performance of the electrode from being degraded. Reference numeral 971 (not illustrated) denotes a vacuum chamber for suctioning the internal gas of the slurry mixer 911 of the mixing unit 900. The internal gas of the slurry mixer 911 moved to the vacuum chamber 971 is separately discharged. Reference numeral 972 (not illustrated) denotes a vacuum pump for providing a suction force to the vacuum chamber 971. The gas suctioned by the vacuum pump 972 is separately discharged.

A particle transfer method according to one embodiment of the present invention can allow the precisely-measured particles to smoothly pass through the corresponding vertically-installed vertical pipe of the particle transfer line when the powder-type particles are transferred along the particle transfer line and prevent the particles from remaining or stagnating in the corresponding vertical pipe.

The particle transfer method according to one embodiment of the present invention will be described as a method of transferring the particles using the particle transfer system according to one embodiment of the present invention.

The particle transfer method according to one embodiment of the present invention may include a particle transfer operation S1. The particle transfer operation S1 may include at least any one of a first transfer operation of transferring particles in correspondence to the first transfer information, a second transfer operation of transferring the particles in correspondence to the second transfer information that is the same as or different from the first transfer information, and a third transfer operation of transferring the particles in correspondence to third transfer information that is equal to or less than the first transfer information or the second transfer information.

The first transfer operation may include a first suction-feed operation of allowing some particles in the first transfer information to pass through the first vertical pipe by the suction-feed method using the suction force acting on the upper end side of the first vertical pipe 130 when the particles in the first transfer unit 100 move up in the first vertical pipe 130 formed to extend in the height direction, and a first pressure-feed operation of allowing the remaining particles in the first transfer information to pass through the first vertical pipe 130 by the pressure-feed method using the pressure acting on the lower end side of the first vertical pipe 130 after the first suction-feed method.

A detailed configuration of the first transfer operation will be replaced with the above-described coupling relationship and operation of the first transfer unit 100.

The second transfer operation may include a second suction-feed operation of allowing some particles in the second transfer information to pass through the second vertical pipe 230 by the suction-feed method using the suction force acting on the upper end side of the second vertical pipe 230 when the particles in the second transfer unit 200 move up in the second vertical pipe 230 formed to extend in the height direction, and a second pressure-feed operation of allowing the remaining particles in the second transfer information to pass through the second vertical pipe 230 by the pressure-feed method using the pressure acting on the lower end side of the second vertical pipe 230 after the second suction-feed operation.

A detailed configuration of the second transfer operation will be replaced with the above-described coupling relationship and operation of the second transfer unit 200.

The third transfer operation may include a third input operation of measuring the particles stored in the third input module 310 with the third transfer information and discharging the measured particles, and a third pressure-feed operation of pressing the particles discharged from the third input module 310 using the process gas or the compressed air so that the particles discharged after the third input operation are transferred by the pressure-feed method using the pressure.

A detailed configuration of the third transfer operation will be replaced with the above-described coupling relationship and operation of the third transfer unit 300.

The particle transfer method according to one embodiment of the present invention may further include a binder transfer operation S2 and a solvent transfer operation S3. In this case, the particles may be formed of an active material that is a raw material of the electrode.

The binder transfer operation S2 converts the binder to be mixed with the active material into the liquid solution in correspondence to the binder transfer information and transfers the liquid solution.

A detailed configuration of the binder transfer operation S2 will be replaced with the above-described coupling relationship and operation of the binder transfer unit 500.

In the solvent transfer operation S the solvent is transferred to form the solution by dissolving the binder in correspondence to the solvent transfer information.

A detailed configuration of the solvent transfer operation S3 will be replaced with the above-described coupling relationship and operation of the solvent transfer unit 600.

The particle transfer method according to one embodiment of the present invention may further include at least any one of a conductive material transfer operation S4 and a dispersant transfer operation S5.

In the conductive material transfer operation S4, the conductive material to be mixed with the slurry is transferred to form the electrodes in correspondence to the conductive material transfer information.

A detailed configuration of the conductive material transfer operation S4 will be replaced with the above-described coupling relationship and operation of the conductive material transfer unit 700.

In the dispersant transfer operation S5, the dispersant to be mixed with the slurry is transferred to form the electrodes in correspondence to the dispersant transfer information.

A detailed configuration of the dispersant transfer operation S5 will be replaced with the above-described coupling relationship and operation of the dispersant transfer unit 800.

The particle transfer method according to one embodiment of the present invention may further include a mixing operation S6.

In the mixing operation S6, the particles transferred through the particle transfer operation S1, the solution transferred through the binder transfer operation S2, and the solvent transferred through the solvent transfer operation S3 are mixed to form the slurry for forming the electrodes.

A detailed configuration of the mixing operation S6 will be replaced with the above-described coupling relationship and operation of the slurry mixer 911 and the slurry stirrer 912 of the mixing unit 900.

The particle transfer method according to one embodiment of the present invention may further include a slurry transfer operation S7.

In the slurry transfer operation S7, the slurry discharged through the mixing operation S6 is transferred to a subsequent process. A detailed configuration of the slurry transfer operation S7 will be replaced with the above-described coupling relationship and operation of the slurry transfer pump 930, the slurry magnet filter 920, and the slurry mesh filter 940.

Reference numeral S8 (not illustrated) denotes an electrolyte supply operation of supplying the preset amount of electrolyte to the mixing unit 900. Since the electrolyte is supplied to the slurry, it is possible to actively ionize the active material in the finally-completed electrode and prevent the performance of the electrode from being degraded.

In a process input operation, the surface of the current collector may be coated with the finally-completed slurry.

According to the above-described particle transfer system and particle transfer method, it is possible to allow preciously-measured particles to smoothly pass through the vertically-installed vertical pipe of the transfer line when the powder-type particles are transferred along the transfer line and prevent the particles from remaining or stagnating in the vertical pipe.

In addition, since the pressure-feed of particles is performed after the suction-feed of the particles in the first particle line of the particle transfer line, it is possible to minimize the load acting on the first vertical pipe 130, reduce the thickness of the first vertical pipe 130, and expect the cost saving effect by reducing the maintenance cost and the material cost.

In addition, through the detailed configuration of the first transfer unit 100, it is possible to smoothly transfer the particles between the first input module 110 and the first measuring module 140 and clearly perform the suction-feed of the particles and the pressure-feed of the particles in the first particle line of the particle transfer line.

In addition, through the detailed configuration of the first measuring module 140, it is possible to stably generate the suction force for suction-feeding the particles in the first particle line of the particle transfer line and smoothly transfer the particles between the first vertical pipe 130 and the first measuring hopper 141 in the integrated first measuring module 140.

In addition, through the detailed configuration of the first vacuum ejector 143, it is possible to provide the stable suction force to the particles, clearly perform continuous transfer of the particles in correspondence to the first transfer information, and prevent the particles from remaining or stagnating in the first vertical pipe 130, thereby eliminating the clogging of the first particle line or the first vertical pipe 130.

In addition, through the detailed configuration of the first input module 110, it is possible to easily transfer the particles transferred from the outside and remove the foreign substances mixed with the particles, thereby increasing the purity of the particles.

In addition, since the pressure-feed of particles is performed after the suction-feed of the particles in the second particle line of the particle transfer line, it is possible to minimize the load acting on the second vertical pipe 230, reduce the thickness of the second vertical pipe 230, and expect the cost saving effect by reducing the maintenance cost and the material cost.

In addition, through the detailed configuration of the second transfer unit 200, it is possible to smoothly transfer the particles between the second input module 210 and the second measuring module 240 and clearly perform the suction-feed of the particles and the pressure-feed of the particles in the second particle line of the particle transfer line.

In addition, through the detailed configuration of the second measuring module 240, it is possible to stably generate the suction force for suction-feeding the particles in the second particle line of the particle transfer line and smoothly transfer the particles between the second vertical pipe 230 and the second measuring hopper 241 in the integrated second measuring module 240.

In addition, through the detailed configuration of the second vacuum ejector 243, it is possible to provide the stable suction force to the particles, clearly perform continuous transfer of the particles in correspondence to the second transfer information and prevent the particles from remaining or stagnating in the second vertical pipe 230, thereby eliminating the clogging of the second particle line or the second vertical pipe 230.

In addition, through the detailed configuration of the second transfer unit 200, it is possible to smoothly transfer the particles between the second input module 210 and the silo module 260 and clearly perform the suction-feed of the particles and the pressure-feed of the particles in the second particle line of the particle transfer line.

In addition, through the detailed configuration of the silo module 260, it is possible to stably generate the suction force for suction-feeding the particles in the second particle line of the particle transfer line and smoothly transfer the particles between the second vertical pipe 230 and the particle silo 261 in the integrated silo module 260.

In addition, through the detailed configuration of the silo vacuum ejector 262, it is possible to provide the stable suction force to the particles, clearly perform continuous transfer of the particles in correspondence to the second transfer information, and prevent the particles from remaining or stagnating in the second vertical pipe 230, thereby eliminating the clogging of the second particle line or the second vertical pipe 230.

In addition, through the detailed configuration of the second transfer unit 200, it is possible to smoothly transfer the particles between the silo module 260 and the second measuring module 240 and clearly perform the suction-feed of the particles and the pressure-feed of the particles in the second particle line of the particle transfer line.

In addition, it is possible to store the large amount of particles transferred from the outside and then intermittently discharge the particles through the silo module 260.

In addition, through the detailed configuration of the second input module 210, it is possible to easily transfer the particles transferred from the outside and remove the foreign substances mixed with the particles, thereby increasing the purity of the particles.

In addition, through a detailed configuration of the third transfer unit 300, it is possible to adjust the amounts of particles according to the state of the slurry finally completed in the mixing unit 900, which is the final destination of the particles, and additionally input the particles.

In addition, through the additional configuration of the binder transfer unit 500 and the solvent transfer unit 600, it is possible to stably manufacture the slurry for forming the electrodes using the particles formed of the active material.

In addition, through the detailed configuration of the binder transfer unit 500, it is possible to stably dissolve the powder-type or fillet-type binder and simply adjust the concentration of the solution formed by dissolving the binder.

In addition, through the detailed configuration of the solvent transfer unit 600, it is possible to stably supply the predetermined amount of solvent to the required unit.

In addition, through the additional configuration of the conductive material transfer unit 700, it is possible to stably supply the predetermined amount of conductive material to the finally-completed slurry and increase the electrical conductivity of the slurry.

In addition, through the detailed configuration of the conductive material transfer unit 700, it is possible to smoothly transfer the conductive material by liquefying the conductive material and allow the conductive material and the active material to safely uniformly form the mixture.

In addition, through the additional configuration of the dispersant transfer unit 800, it is possible to smoothly transfer the particles that are the active material and increase the merchantability of the finally-completed slurry.

In addition, through the detailed configuration of the dispersant transfer unit 800, it is possible to smoothly transfer the dispersant by liquefying the dispersant, allow the dispersant to smoothly perform the pre-dispersion of the active material, and allow the dispersant and the active material to stably uniformly form the mixture.

In addition, through the additional configuration of the mixing unit 900, it is possible to stabilize the finally-completed slurry in order to form the electrodes.

In addition, through the detailed configuration of the mixing unit 900, it is possible to allow the slurry to stably uniformly form the mixture and simply adjust the concentration of the slurry.

In addition, through the detailed configurations of the particle transfer method, it is possible to clarify the coupling relationship of the particle transfer system, implement the stable particle transfer system, and clearly provide the effects of the above-described units.

Although exemplary embodiments of the present invention have been described above with reference to the drawings, those skilled in the art can variously modify or change the present invention without departing from the spirit and scope of the present invention described in the appended claims.

INDUSTRIAL APPLICABILITY

A particle transfer system and a particle transfer method according to the present invention are a technology for transferring powder-type particles and are technology for preventing precisely-measured particles from remaining or stagnating in a vertically-disposed vertical pipe of a transfer line.

The invention claimed is:
1. A particle transfer system comprising:
a particle transfer unit including a first transfer unit, a second transfer unit, and a third transfer unit, wherein the first transfer unit is configured to transfer particles based on first transfer information that identifies at least how much material passes through the first transfer unit and a feed method used to pass particles through the first transfer unit,
the second transfer unit is spaced apart from the first transfer unit to transfer the particles based on second transfer information, and
the third transfer unit is spaced apart from the first transfer unit and the second transfer unit to transfer the particles based on third transfer information,
wherein, when the particles in the first transfer unit move up in a first vertical pipe formed to extend in a height direction, (i) some particles, based on the first transfer information, pass through the first vertical pipe by a suction-feed method using a suction force acting on an upper end side of the first vertical pipe, and (ii) the remaining particles, based on the first transfer information, pass through the first vertical pipe by a pressure-feed method using a pressure acting on a lower end side of the first vertical pipe, and
wherein the first transfer unit includes:
a first input module in which the particles are stored and configured to (i) measure the particles based on the first transfer information, and (ii) discharge the measured particles,
a 1-1 pressure-feed module (i) connected to the lower end side of the first vertical pipe, (ii) connected to the first input module, and (iii) configured to press the particles discharged from the first input module using a process gas or compressed air so that the particles discharged from the first input module are transferred by the pressure-feed method using the pressure,
the first vertical pipe formed to extend in a height direction to form a path through which the particles discharged from the first input module move up,
a first measuring module connected to the upper end side of the first vertical pipe with respect to the first vertical pipe and configured to
suction and store the particles discharged from the first input module using one of the process gas, the compressed air, and the particles in the first vertical pipe so that the particles discharged from the first input module are transferred by the suction-feed method using the suction force,
measure the particles based on the first information, and
discharge the measured particles using a rotary valve method.

2. The particle transfer system of claim 1, wherein the first transfer unit includes:
a 1-2 pressure-feed module configured to press the particles discharged from the first measuring module using the process gas or the compressed air so that the particles discharged from the first measuring module are transferred by the pressure-feed method using the pressure,
wherein
the 1-2 pressure-feed module is connected to the first measuring module.

3. The particle transfer system of claim 2, wherein the first measuring module includes:
a first measuring hopper in which the particles transferred through the first vertical pipe are stored;
a first vacuum ejector configured to suction the particles discharged from the first input module by the suction-feed method using the suction force and transfer the particles to the first measuring hopper; and
a first measuring valve configured to measure the particles stored in the first measuring hopper with the first transfer information and discharge the measured particles using the rotary valve method.

4. The particle transfer system of claim 3, wherein the first vacuum ejector includes:
a vacuum tank part of which an inside is maintained in a vacuum state by the process gas or the compressed air;
a vacuum head part configured to generate the suction force as the process gas or the compressed air is input to maintain the inside of the vacuum tank part in the vacuum state;
a particle input part to which the first vertical pipe is connected so that the first vertical pipe and the vacuum tank part communicate with each other;
a connection valve part configured to allow the vacuum tank part and the first measuring hopper to be opened or closed to communicate or not communicate with each other; and
a control unit configured to control operation relationships between the first input module, the 1-1 pressure-feed module, and the vacuum head part, and
the control unit is configured to:
operate the vacuum head part in a state of stopping the 1-1 pressure-feed module to allow some particles to pass through the first vertical pipe by the suction-feed method using the suction force as the particles are discharged from the first input module; and
operate the 1-1 pressure-feed module together with a stop of the vacuum head part to allow the remaining particles to pass through the first vertical pipe by the pressure-feed method using the pressure.

5. The particle transfer system of claim 1, wherein the first input module includes:
a first input hopper in which the particles are stored;
a first magnet filter configured to filter magnetic foreign substances from the particles when the particles are input to the first input hopper;
a first mesh filter configured to filter non-magnetic foreign substances from the particles when the particles are input to the first input hopper; and
a first input valve configured to measure the particles stored in the first input hopper with the first transfer information and discharge the measured particles using the rotary valve method.

6. The particle transfer system of claim 1, wherein the third transfer unit includes:
a third input module in which the particles are stored and configured to measure the particles with the third transfer information and discharge the measured particles; and
a third pressure-feed module configured to press the particles discharged from the third input module using the process gas or the compressed air so that the particles discharged from the third input module are transferred by the pressure-feed method using the pressure.

7. The particle transfer system of claim 1, further comprising:
a binder transfer lit configured to convert a binder to be mixed with an active material into a liquid solution in correspondence to binder transfer information and transfer the liquid solution; and
a solvent transfer unit configured to transfer a solvent for forming the solution by dissolving the binder based on solvent transfer information,
wherein the particles are formed of the active material that is a raw material of an electrode.

8. The particle transfer system of claim 7, wherein the binder transfer unit includes:

a binder input module in which the binder is stored and configured to measure the binder based on the binder transfer information and discharge the measured binder;
a binder pressure-feed module configured to press the binder discharged from the binder input module using the process gas or the compressed air so that the binder discharged from the binder input module is transferred by the pressure-feed method using the pressure;
a binder mixing module configured to mix the binder transferred through the binder pressure-feed module and the solvent transferred through the solvent transfer unit to form the solution; a solution transfer module configured to pump the solution;
a solution hopper scale in which the solution transferred from the solution transfer module is stored and configured to discharge a predetermined amount of solution based on solution transfer information; and
a solution supply pump configured to pump the solution of the solution hopper scale based on the solution transfer information.

9. The particle transfer system of claim 7, wherein the solvent transfer unit includes:
a solvent tank in which the solvent is stored;
a solvent pumping module configured to pump the solvent stored in the solvent tank;
a mixing adjustment module configured to adjust an amount of the solvent to be mixed with the binder; and
a slurry adjustment module configured to adjust an amount the solvent to be mixed with a solution.

10. The particle transfer system of claim 7, further comprising:
a conductive material transfer unit configured to transfer a conductive material to be mixed with a slurry for forming electrodes based on conductive material transfer information, and
a dispersant transfer unit configured to transfer a dispersant to be mixed with the slurry for forming the electrodes based on to dispersant transfer information.

11. The particle transfer system of claim 10, wherein the conductive material transfer unit includes:
a conductive material hopper scale in which the conductive material is stored; and
a conductive material supply pump configured to pump a predetermined amount of the conductive material stored in the conductive material hopper scale based on the conductive material transfer information.

12. The particle transfer system of claim 10, wherein the dispersant transfer unit includes:
a dispersant hopper scale in which the dispersant is stored; and
a dispersant supply pump configured to pump a predetermined amount of the dispersant stored in the dispersant hopper scale based on the dispersant transfer information.

13. The particle transfer system of claim 7, further comprising:
a mixing unit configured to mix the particles transferred through the particle transfer unit, the solution transferred through the binder transfer unit, and the solvent transferred through the solvent transfer unit.

14. A particle transfer system comprising:
a particle transfer unit including a first transfer unit, a second transfer unit, and a third transfer unit, wherein the first transfer unit is configured to transfer particles based on first transfer information, the second transfer unit is spaced apart from the first transfer unit to transfer the particles based on second transfer information that identifies at least how much material passes through the second transfer unit and a feed method used to pass particles through the second transfer unit, and the third transfer unit is spaced apart from the first transfer unit and the second transfer unit to transfer the particles based on third transfer information, wherein when the particles in the second transfer unit move up in a second vertical pipe formed to extend in a height direction, (i) some particles, based on the second transfer information, pass through the second vertical pipe by a suction-feed method using a suction force acting on an upper end side of the second vertical pipe, and (ii) the remaining particles, based on the second transfer information, pass through the second vertical pipe by a pressure-feed method using a pressure acting on a lower end side of the second vertical pipe, and wherein the second transfer unit includes:

a second input module in which the particles are stored and configured to (i) measure the particles based on the second transfer information and (ii) discharge the measured particles, a 2-1 pressure-feed module (i) connected to the lower end side of the second vertical pipe with respect to the second vertical pipe, (ii) connected to the second input module, and (iii) configured to press the particles discharged from the second input module using a process gas or compressed air so that the particles discharged from the second input module are transferred by the pressure-feed method using the pressure, the second vertical pipe formed to extend in the height direction to form a path through which the particles discharged from the second input module move up, and a second measuring module connected to the upper end side of the second vertical pipe with respect to the second vertical pipe and configured to suction and store the particles discharged from the second input module using one of the process gas, the compressed air, or the particles in the second vertical pipe so that the particles discharged from the second input module are transferred by the suction-feed method using the suction force, measure the particles based on the second information, and discharge the measured particles using a rotary valve method.

15. The particle transfer system of claim 14, wherein the second transfer unit includes:

a 2-2 pressure-feed module configured to press the particles discharged from the second measuring module using the process gas or the compressed air so that the particles discharged from the second measuring module are transferred by the pressure-feed method using the pressure, wherein the second input module is connected to the 2-1 pressure-feed module, and the second measuring module is connected to the upper end side of the second vertical pipe with respect to the second vertical pipe, and the 2-2 pressure-feed module is connected to the second measuring module.

16. The particle transfer system of claim 15, wherein the second measuring module includes:

a second measuring hopper in which the particles transferred through the second vertical pipe are stored;

a second vacuum ejector configured to suction the particles discharged from the second input module by the suction-feed method using the suction force and transfer the particles to the second measuring hopper; and a second measuring valve configured to measure the particles stored in the second measuring hopper with the second information and discharge the measured particles using the rotary valve method.

17. The particle transfer system of claim 16, wherein the second vacuum ejector includes:

a vacuum tank part of which an inside is maintained in a vacuum state by the process gas or the compressed air;

a vacuum head part configured to generate the suction force as the process gas or the compressed air is input to maintain the inside of the vacuum tank part in the vacuum state; a particle input part to which the second vertical pipe is connected so that the second vertical pipe and the vacuum tank part communicate with each other;

a connection valve part configured to allow the vacuum tank part and the second measuring hopper to be closed to communicate or not communicate with each other; and a control unit configured to control operation relationships between the second input module, the 2-1 pressure-feed module, and the vacuum head part, and the control unit is configured to:

operate the vacuum head part in a state of stopping the 2-1 pressure-feed module to allow some particles to pass through the second vertical pipe by the suction-feed method using the suction force as the particles are discharged from the second input module; and operate the 2-1 pressure-feed module together with a stop of the vacuum head part to allow the remaining particles to pass through the second vertical pipe by the pressure-feed method using the pressure.

18. The particle transfer system of claim 14, wherein the second input module includes:

a second input hopper in which the particles are stored;

a second magnet filter configured to filter magnetic foreign substances from the particles when the particles are input to the second input hopper;

a second mesh filter configured to filter non-magnetic foreign substances from the particles when the particles are input to the second input hopper; and a second input valve configured to measure the particles stored in the second measuring hopper with the second transfer information and discharge the measured particles using the rotary valve method.

19. A particle transfer system comprising:

a particle transfer unit including (i) a first transfer unit configured to transfer particles based on first transfer information, (ii) a second transfer unit spaced apart from the first transfer unit to transfer the particles based on second transfer information, and (iii) a third transfer unit spaced apart from the first transfer unit and the second transfer unit to transfer the particles based on, wherein when the particles in the second transfer unit move up in a second vertical pipe formed to extend in a height direction, (i) some particles, based on the second transfer information, pass through the second vertical pipe by a suction-feed method using a suction force acting on an upper end side of the second vertical pipe, and (ii) the remaining particles, based on the second transfer information, pass through the second vertical pipe by a pressure-feed method using a pressure acting on a lower end side of the second vertical pipe, wherein the second transfer unit includes:

a second input module in which the particles are stored and configured to (i) measure the particles based on the second transfer information, and (ii) discharge the measured particles;

a 2-1 pressure-feed module (i) connected to the lower end side of the second vertical pipe with respect to the second vertical pipe, (ii) connected to the second input module, and (iii) configured to press the particles discharged from the second input module using a process gas or compressed air so that the particles discharged from the second input module are transferred by the pressure-feed method using the pressure;

the second vertical pipe formed to extend in the height direction to form a path through which the particles discharged from the second input module move up;

a silo module connected to the upper end side of the second vertical pipe with respect to the second vertical pipe and configured to suction and store the particles discharged from the second input module using one of the process gas, the compressed air, or the particles in the second vertical pipe so that the particles discharged from the second input module are transferred by the suction-feed method using the suction force, measure the particles based on the second information, and discharge the measured particles using a feeding method; and a silo pressure-feed module connected to the silo module and configured to press the particles discharged from the silo module using the process gas or the compressed air so that the particles discharged from the silo module are transferred by the pressure-feed method using the pressure.

20. The particle transfer system of claim 19, wherein the silo module includes:

a particle silo in which the particles transferred through the second vertical pipe are stored;

a silo vacuum ejector configured to suction the particles discharged from the second input module by the suction-feed method using the suction force and transfer the particles to the particle silo; and a table feeder configured to measure the particles stored in the body silo with the second information and discharge the measured particles using the feeding method.

21. The particle transfer system of claim 20, wherein the silo vacuum ejector includes:

a vacuum tank part of which an inside is maintained in a vacuum state by the process gas or the compressed air;

a vacuum head part configured to generate the suction force as the process gas or the compressed air is input to maintain the inside of the vacuum tank part in the vacuum state;

a particle input part to which the second vertical pipe is connected so that the second vertical pipe and the vacuum tank part communicate with each other;

a connection valve part configured to allow the vacuum tank part and the particle silo to be opened or closed to communicate or not communicate with each other; and a control unit configured to control operation relationships between the second input module, the 2-1 pressure-feed module, and the vacuum head part, and the control unit is configured to:

operate the vacuum head part in a state of stopping the 2-1 pressure-feed module to allow some particles to pass through the second vertical pipe by the suction-feed method using the suction force as the particles are discharged from the second input module; and operate the 2-1 pressure-feed module together with a stop of the vacuum head part to allow the remaining particles to pass through the second vertical pipe by the pressure-feed method using the pressure.

22. A particle transfer system comprising a particle transfer unit including a first transfer unit configured to transfer particles based on first transfer information, a second transfer unit spaced apart from the first transfer unit to transfer the particles based on second transfer information, and a third transfer unit spaced apart from the first transfer unit and the second transfer unit to transfer the particles based on third transfer information, wherein when the particles in the second transfer unit move up in a second vertical pipe formed to extend in a height direction, (i) some particles, based on the second transfer information, pass through the second vertical pipe by a suction-feed method using a suction force acting on an upper end side of the second vertical pipe, and (ii) the remaining particles, based on the second transfer information, pass through the second vertical pipe by a pressure-feed method using a pressure acting on a lower end side of the second vertical pipe, wherein the second transfer unit includes:

a silo module in which the particles are stored and configured to measure the particles based on the second transfer information and discharge the measured particles using the feeding method;

a silo pressure-feed module (i) connected to the lower end side of the second vertical pipe with respect to the second vertical pipe, (ii) connected to the silo module, and (iii) configured to press the particles discharged from the silo module using a process gas or compressed air so that the particles discharged from the silo module are transferred by the pressure-feed method using the pressure;

the second vertical pipe formed to extend in the height direction to form a path through which the particles discharged from the silo module move up;

a second measuring connected to the upper end side of the second vertical pipe with respect to the second vertical pipe module and configured to suction and store the particles discharged from the silo module using one of the process gas, the compressed air, and the particles in the second vertical pipe so that the particles discharged from the silo module are transferred by the suction-feed method using the suction force, measure the particles based on the second information, and discharge the measured particles using a rotary valve method; and a 2-2 pressure-feed module connected to the second measuring module and configured to press the particles discharged from the second measuring module using the process gas or the compressed air so that the particles discharged from the second measuring module are transferred by the pressure-feed method using the pressure.

23. The particle transfer system of claim 22, wherein the second measuring module includes:

a second measuring hopper in which the particles transferred through the second vertical pipe are stored;

a second vacuum ejector configured to suction the particles discharged from the silo module by the suction-feed method using the suction force and transfer the particles to the second measuring hopper; and a second measuring valve configured to measure the particles stored in the second measuring hopper based on the second information and discharge the measured particles using the rotary valve method.

24. The particle transfer system of claim 23, wherein the second vacuum ejector includes:

a vacuum tank part of which an inside is maintained in a vacuum state by the process gas or the compressed air;

a vacuum head part configured to generate the suction force as the process gas or the compressed air is input to maintain the inside of the vacuum tank part in the vacuum state;

a particle input part to which the second vertical pipe is connected so that the second vertical pipe and the vacuum tank part communicate with each other;

a connection valve part configured to allow the vacuum tank part and the second measuring hopper to be opened or closed to communicate or not communicate with each other; and a control unit configured to control operation relationships between the silo module, the silo pressure-feed module, and the vacuum head part, and the control unit is configured to:

operate the vacuum head part in a state of stopping the silo pressure-feed module to allow some particles to pass through the second vertical pipe by the suction-feed method using the suction force as the particles are discharged from the silo module; and operate the silo pressure-feed module together with a stop of the vacuum head part to allow the remaining particles to pass through the second vertical pipe by the pressure-feed method using the pressure.

* * * * *